United States Patent
Matsuo et al.

(10) Patent No.: US 12,367,446 B2
(45) Date of Patent: Jul. 22, 2025

(54) INFORMATION PROCESSING SYSTEM, DELIVERY MANAGEMENT METHOD, WEARABLE DEVICE, INFORMATION PROCESSING METHOD, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Mikiko Matsuo, Nara (JP); Kenta Murakami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/744,917

(22) Filed: Jun. 17, 2024

(65) Prior Publication Data

US 2024/0338642 A1    Oct. 10, 2024

Related U.S. Application Data

(63) Continuation of application No. PCT/JP2022/040524, filed on Oct. 28, 2022.

(30) Foreign Application Priority Data

Dec. 23, 2021  (JP) .................. 2021-209113

(51) Int. Cl.
G06Q 10/083    (2024.01)
G02B 27/01     (2006.01)
(Continued)

(52) U.S. Cl.
CPC ....... *G06Q 10/083* (2013.01); *G02B 27/0176* (2013.01); *G06K 7/1404* (2013.01); *G06V 40/107* (2022.01); *G02B 2027/0178* (2013.01)

(58) Field of Classification Search
CPC .................................................. G06Q 10/08
See application file for complete search history.

(56) References Cited

U.S. PATENT DOCUMENTS

2018/0174100 A1* 6/2018 Tagami .............. G06Q 30/0613
2019/0244448 A1* 8/2019 Alamin .................... G07C 9/20
(Continued)

FOREIGN PATENT DOCUMENTS

JP          6696057         5/2020

OTHER PUBLICATIONS

Smykalov, Yury; "Access Codes—Offline Payments, Gifts and Promotions"; Jun. 23, 2021; InviteMember: https://web.archive.org/web/20210623014037/https://help.invitemember.com/en/articles/2653926-access-codes-offline-payments-gifts-and-promotions (Year: 2021).*

(Continued)

*Primary Examiner* — Shannon S Campbell
*Assistant Examiner* — David G. Godbold
(74) *Attorney, Agent, or Firm* — Wenderoth, Lind & Ponack, L.L.P.

(57) ABSTRACT

A delivery management server performs: receiving an article ID identifying an article being an operation object of a worker and a worker ID identifying the worker from a smart glasses structure; extracting delivery history information associated with a delivery destination ID associated with the received article ID; determining whether the worker ID received at present is identical to a previous worker ID of a worker having previously delivered to a delivery destination associated with the delivery destination ID in the extracted (Continued)

delivery history information; extracting delivery destination peculiar information which is peculiar to the delivery destination associated with the delivery destination ID and is about a delivery of an article when the worker ID received at present and the previous worker ID are not identical to each other; and sending the extracted delivery destination peculiar information to the smart glasses structure.

12 Claims, 20 Drawing Sheets

(51) Int. Cl.
*G06K 7/14* (2006.01)
*G06V 40/10* (2022.01)

(56) References Cited

U.S. PATENT DOCUMENTS

| | | | |
|---|---|---|---|
| 2020/0272969 A1 | 8/2020 | Yoshida | |
| 2021/0004895 A1* | 1/2021 | Kuriyagawa | G06Q 50/40 |
| 2022/0027845 A1* | 1/2022 | Silverstein | G06Q 10/0838 |
| 2022/0028514 A1* | 1/2022 | Myers | G16H 20/10 |

OTHER PUBLICATIONS

International Search Report issued Jan. 17, 2023 in International (PCT) Application No. PCT/JP2022/040524.

\* cited by examiner

FIG.3

| DELIVERY DESTINATION ID | ARTICLE ID | DELIVERY STATUS | WORKER ID | DELIVERY DATE AND TIME | ADDRESSEE INFORMATION | ADDRESS INFORMATION |
|---|---|---|---|---|---|---|
| 378087 | 7890-1234-56 | IN TRANSIT | — | — | XXXX | ...KADOMA-SHI, OSAKA, 5710000 |
| 378087 | 1234-5678-90 | DELIVERED | 549 | 15:00, OCT. 12, 2021 | XXXX | ...KADOMA-SHI, OSAKA, 5710000 |
| 378087 | 0123-4567-89 | DELIVERED | 549 | 12:30, OCT. 10, 2021 | XXXX | ...KADOMA-SHI, OSAKA, 5710000 |
| ... | ... | ... | ... | ... | ... | ... |

FIG.4

| DELIVERY DESTINATION ID | DELIVERY DESTINATION PECULIAR INFORMATION |
|---|---|
| 378087 | PUT ARTICLE BELOW GAS METER IN ABSENCE OF RECIPIENT. |
| 378088 | CONFIRM WITH ADJACENT RESIDENT IN ABSENCE OF RECIPIENT. |
| 378089 | PRESS RIGHT INTERCOM FOR RECIPIENT "A" OR"B", AND PRESS LEFT INTERCOM FOR RECIPIENT "C" OR"D". |
| 378090 | PUT ARTICLE IN TIMEFRAME FROM 13:00 TO 15:00 WITHOUT PRESSING INTERCOM. |
| 378091 | TIMEFRAME OF ONE HOUR FROM 18:00 ON MONDAYS SHOWS HIGHER STAY-AT-HOME RATE. |
| ... | ... |

FIG.18

| DELIVERY DESTINATION ID | DELIVERY DESTINATION PECULIAR INFORMATION | UPDATE DATE AND TIME |
|---|---|---|
| 378087 | PUT ARTICLE BELOW GAS METER IN ABSENCE OF RECIPIENT. | 15:00, OCT. 13, 2021 |
| 378088 | CONFIRM WITH ADJACENT RESIDENT IN ABSENCE OF RECIPIENT. | 13:00, AUG. 1, 2021 |
| 378089 | PRESS RIGHT INTERCOM FOR RECIPIENT "A" OR "B", AND PRESS LEFT INTERCOM FOR RECIPIENT "C" OR "D". | 12:00, FEB. 18, 2021 |
| 378090 | PUT ARTICLE IN TIMEFRAME FROM 13:00 TO 15:00 WITHOUT PRESSING INTERCOM. | 9:00, MAR. 25, 2021 |
| 378091 | TIMEFRAME OF ONE HOUR FROM 18:00 ON MONDAYS SHOWS HIGHER STAY-AT-HOME RATE. | 18:00, SEP. 10, 2021 |
| ... | ... | ... |

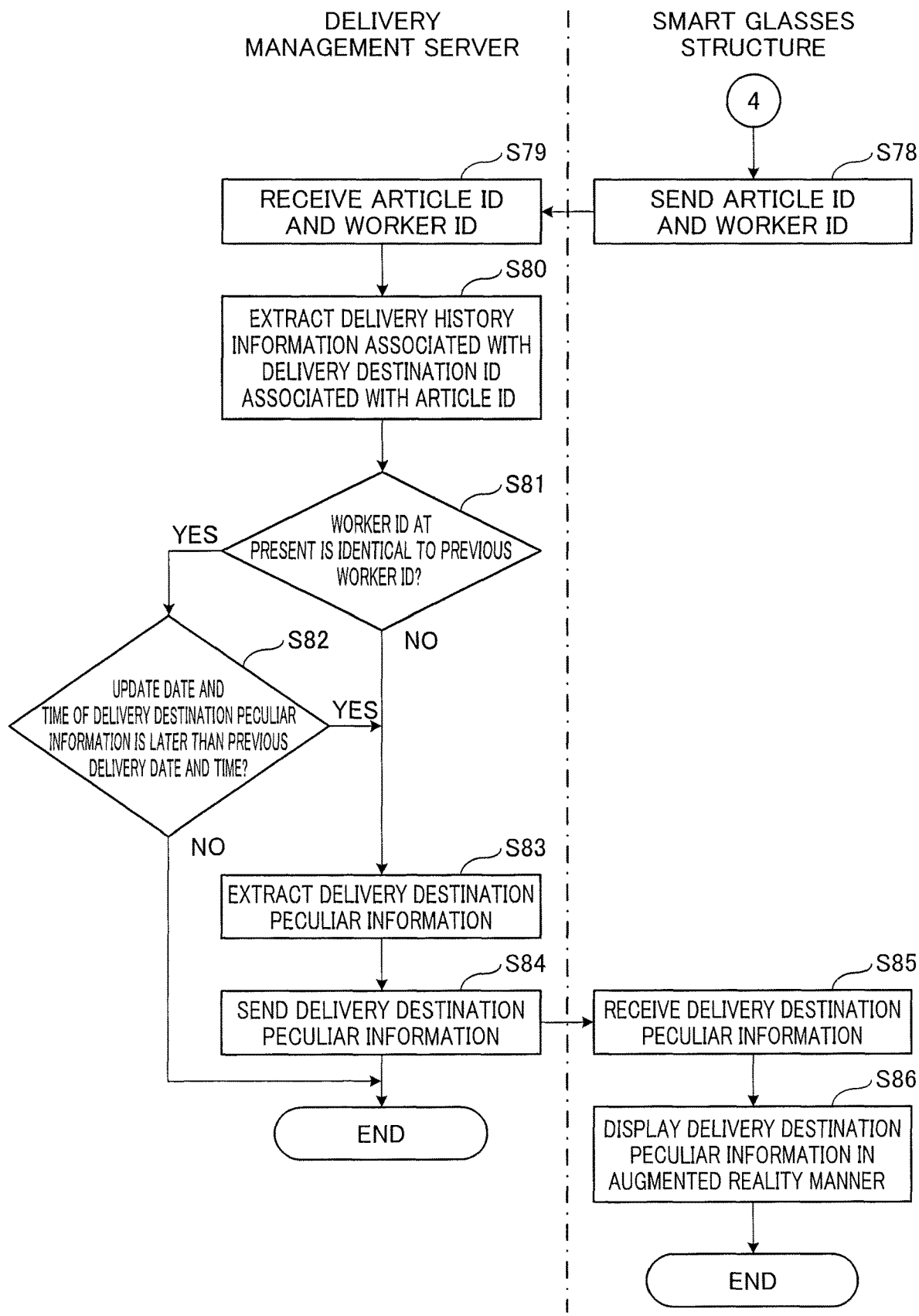

INFORMATION PROCESSING SYSTEM, DELIVERY MANAGEMENT METHOD, WEARABLE DEVICE, INFORMATION PROCESSING METHOD, AND NON-TRANSITORY COMPUTER READABLE RECORDING MEDIUM STORING INFORMATION PROCESSING PROGRAM

FIELD OF INVENTION

The present disclosure relates to a technology of assisting a worker with a work of delivering an article.

BACKGROUND ART

For instance, Patent Literature 1 describes a smart glasses structure that reads a product code from a two-dimensional code shown in a captured image having been acquired from a camera, and sends the read product code, a work type, and a worker code of the worker to a server device. The server device determines whether there is attention information that satisfies the conditions of the product code, the work type, and a skill level with reference to an attention table, specifies attention information satisfying the conditions, a period, and an output timing when such attention information is stored, and sends instruction information and the attention information to the smart glasses structure. The smart glasses structure having received the instruction information and the attention information controls a display to display the instruction information, and controls the display to display the attention information at an appropriate timing with reference to the period and the output timing.

The conventional technology provides the attention information uniformly for all the workers including a worker who does not need the attention information, and thus, the technology needs further improvement.

Patent Literature 1: Japanese Patent Publication No. 6696057

SUMMARY OF THE INVENTION

The present disclosure has been accomplished to solve the drawbacks described above, and has an object of providing a technology for providing delivery destination peculiar information which is peculiar to a delivery destination and is about a delivery only for a worker who needs the delivery destination peculiar information, and improving a work efficiency of the worker.

An information processing system according to the present disclosure includes: a wearable device to be attached to a head of a worker; and a delivery management server communicably connected to the wearable device. The wearable device includes a camera, a first control part, and a first communication part. The delivery management server includes a second control part, a second communication part, and a memory. The camera captures an image in a visual field of the worker. The first control part executes: acquiring the image captured by the camera; and recognizing an article ID identifying an article being an operation object of the worker by image recognition processing of the acquired image. The first communication part sends the recognized article ID and a worker ID identifying the worker. The second communication part receives the article ID and the worker ID sent by the first communication part. The memory stores: delivery history information associating article IDs, delivery destination IDs respectively identifying delivery destinations of articles, worker IDs identifying workers having delivered the articles to the delivery destinations, and delivery complete dates and times of the articles with one another; and delivery destination information associating the delivery destination IDs with delivery destination peculiar information which is peculiar to the delivery destinations respectively and is about the deliveries of the articles. The second control part executes: extracting, from the memory, delivery history information associated with the delivery destination ID associated with the received article ID; determining whether the worker ID received at present is identical to a previous worker ID of a worker having previously delivered to the delivery destination associated with the delivery destination ID in the extracted delivery history information; and extracting delivery destination peculiar information associated with the delivery destination ID from the memory when the worker ID received at present and the previous worker ID are not identical to each other. The second communication part sends the extracted delivery destination peculiar information. The first communication part receives the delivery destination peculiar information sent by the second communication part. The first control part outputs the received delivery destination peculiar information.

This disclosure enables provision of delivery destination peculiar information which is peculiar to a delivery destination and is about a delivery only for a worker who needs the delivery destination peculiar information, and achieves improvement in a work efficiency of the worker.

BRIEF DESCRIPTION OF THE DRAWINGS

FIG. 3 is a table showing an example of delivery history information associated with a delivery destination ID associated with a received article ID in the first embodiment.

FIG. 4 is a table showing an example of delivery destination information in the first embodiment.

FIG. 18 is a table showing an example of delivery destination information in the fourth embodiment.

FIG. 20 is a second flowchart explaining the information provision process by the delivery management server and the smart glasses structure in the fourth embodiment of the disclosure.

DETAILED DESCRIPTION

Figure 1:
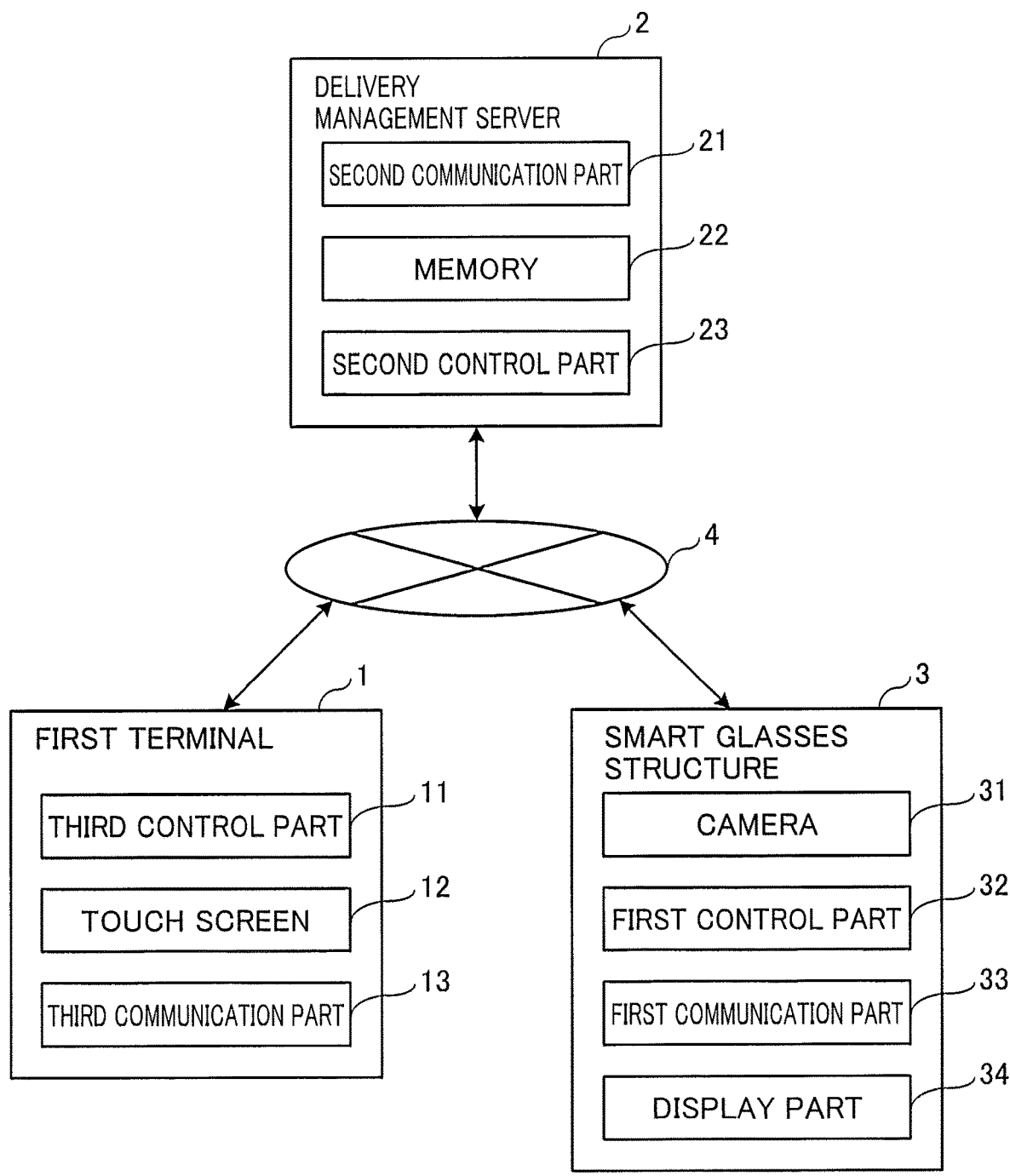
FIG. 1 is a diagram showing an example of a configuration of a delivery system in a first embodiment of the present disclosure.

Knowledge Forming the Basis of the Present Disclosure

The above-described conventional technology includes: capturing and acquiring an image in a sightline direction of a worker by a camera provided at a smart glasses structure; acquiring a product code of an article from the captured and acquired image; and displaying attention information associated with the product code on a display provided at the smart glasses structure. The attention information is uniformly provided for workers who wear their respective smart glasses structures. However, it is unnecessary to provide the attention information for such a worker as having already grasped the attention information. Thus, the displaying of the attention information on the smart glasses structure of the worker who does not need to confirm the attention information may hinder the worker from working.

The following technologies will be described to solve the drawbacks.

(1) An information processing system according to one aspect of the present disclosure includes: a wearable device to be attached to a head of a worker; and a delivery management server communicably connected to the wearable device. The wearable device includes a camera, a first control part, and a first communication part. The delivery management server includes a second control part, a second communication part, and a memory. The camera captures an image in a visual field of the worker. The first control part executes: acquiring the image captured by the camera; and recognizing an article ID identifying an article being an operation object of the worker by image recognition processing of the acquired image. The first communication part sends the recognized article ID and a worker ID identifying the worker. The second communication part receives the article ID and the worker ID sent by the first communication part. The memory stores: delivery history information associating article IDs, delivery destination IDs respectively identifying delivery destinations of articles, worker IDs identifying workers having delivered the articles to the delivery destinations, and delivery complete dates and times of the articles with one another; and delivery destination information associating the delivery destination IDs with delivery destination peculiar information which is peculiar to the delivery destinations respectively and is about the deliveries of the articles. The second control part executes: extracting, from the memory, delivery history information associated with the delivery destination ID associated with the received article ID; determining whether the worker ID received at present is identical to a previous worker ID of a worker having previously delivered to the delivery destination associated with the delivery destination ID in the extracted delivery history information; and extracting delivery destination peculiar information associated with the delivery destination ID from the memory when the worker ID received at present and the previous worker ID are not identical to each other. The second communication part sends the extracted delivery destination peculiar information. The first communication part receives the delivery destination peculiar information sent by the second communication part. The first control part outputs the received delivery destination peculiar information.

In this configuration, when a worker delivering an article to a delivery destination at present is not identical to a worker having previously delivered an article to the delivery destination, delivery destination peculiar information which is peculiar to the delivery destination and is about a delivery of an article is provided for the worker. When the worker delivering the article to the delivery destination at present and the worker having previously delivered the article to the delivery destination are identical to each other, the delivery destination peculiar information is not provided for the worker. This configuration thus enables provision of delivery destination peculiar information which is peculiar to a delivery destination and is a about a delivery only for a worker who needs the delivery destination peculiar information, and achieves improvement in a work efficiency of the worker.

(2) In the information processing system according to (1) above, the delivery destination peculiar information may include information about a treatment for absence of a recipient at the delivery destination.

This configuration allows the worker to confirm the provided delivery destination peculiar information and grasp a treatment for absence of the recipient at the delivery destination. This succeeds in reducing a delivery failure including necessity of redelivery, and achieves improvement in a delivery efficiency.

(3) In the information processing system according to (1) or (2) above, the first control part may execute: recognizing the article being the operation object of the worker and a hand of the worker by the image recognition processing of the acquired image; determining, on the basis of a positional relation between the recognized article and the recognized hand, whether the worker is in processing of carrying the article; and recognizing the article ID by the image recognition processing of the acquired image when it is determined that the worker is in the processing of carrying the article.

In this configuration, an article being an operation object of the worker and a hand of the worker are recognized by image recognition processing of the image in the visual field of the worker captured by the camera, and it is determined, on the basis of a positional relation between the recognized article and the recognized hand, whether the worker is in processing of carrying the article. When it is determined that the worker is in the processing of carrying the article, the article ID is recognized by the image recognition processing of the image.

The recognition attains specifying of the article being the operation object that is in processing of being carried by the worker and facilitated acquisition of the article ID of the specified article.

(4) In the information processing system according to any one of (1) to (3) above, the second control part may execute: determining whether a predetermined day or more days have elapsed from a date of the previous delivery to the delivery destination associated with the delivery destination ID in the extracted delivery history information when the worker ID received at present and the previous worker ID are identical to each other; and extracting the delivery destination peculiar information associated with the delivery destination ID from the memory in a case where the predetermined day or more days have elapsed from the date of the previous delivery.

For example, a worker who has delivered no article to a delivery destination for a long time period since a previous delivery may not remember delivery destination peculiar information which is peculiar to the delivery destination. In this regard, even when the worker delivering the article to the delivery destination at present is identical to a worker having previously delivered an article to the delivery destination, the configuration provides the worker with the delivery destination peculiar information in a case where a predetermined day or more days have elapsed from a date of the previous delivery by the worker to a current date. This allows the worker having delivered no article for the long time period since the previous delivery to confirm the delivery destination peculiar information, and thus succeeds in reducing a delivery failure including necessity of redelivery and achieves improvement in a delivery efficiency.

(5) In the information processing system according to any one of (1) to (3) above, the second control part may execute: determining whether the number of past deliveries to the delivery destination associated with the delivery destination ID in the extracted delivery history information falls within a predetermined number of deliveries when the worker ID received at present and the previous worker ID are identical to each other; and extracting, from the memory, the delivery destination peculiar information associated with the delivery destination ID when the number of past deliveries falls within the predetermined number of deliveries.

For instance, a worker having a smaller number of past deliveries to a delivery destination may not remember delivery destination peculiar information which is peculiar to the delivery destination. In this regard, even when the worker delivering the article to the delivery destination at present is identical to a worker having previously delivered an article to the delivery destination, the configuration provides the worker with delivery destination peculiar information in a case where the number of past deliveries by the worker falls within a predetermined number of deliveries. This allows the worker having the smaller number of past deliveries to the delivery destination to confirm the delivery destination peculiar information, and thus succeeds in reducing a delivery failure including necessity of redelivery and achieves improvement in a delivery efficiency.

(6) In the information processing system according to any one of (1) to (5) above, the first control part may execute: determining whether a recipient is absent at the delivery destination after receiving the delivery destination peculiar information; and outputting the received delivery destination peculiar information when the recipient is absent at the delivery destination.

In this configuration, it is determined whether the recipient is absent at the delivery destination after receiving the delivery destination peculiar information. The received delivery destination peculiar information is output in absence of the recipient at the delivery destination. The delivery destination peculiar information is hence provided for a worker at determination of absence of the recipient at the delivery destination, and thus, the delivery destination peculiar information can be provided for the worker at an appropriate time.

(7) The information processing system according to (6) above may further include an information terminal communicably connected to the wearable device for outputting a delivery notice informing the recipient that the worker brings the article back due to the absence of the recipient at the delivery destination. The information terminal may send a delivery notice output notification to the wearable device when outputting the delivery notice. The first communication part may receive the delivery notice output notification sent by the information terminal. The first control part may determine that the recipient is absent at the delivery destination when the first communication part receives the delivery notice output notification.

In this configuration, the information terminal sends a delivery notice output notification to the wearable device when outputting a delivery notice informing the recipient that the worker brings the article back due to the absence of the recipient at the delivery destination. The wearable device determines that the recipient is absent at the delivery destination when receiving the delivery notice output notification sent by the information terminal.

This consequently enables provision of the delivery destination peculiar information for the worker at a time of outputting the delivery notice.

(8) In the information processing system according to any one of (1) to (7) above, the delivery destination ID and the delivery destination peculiar information in the delivery destination information may be further associated with an update date and time at which the delivery destination peculiar information was updated. The second control part may extract the delivery destination peculiar information associated with the delivery destination ID from the memory, when the worker ID received at present and the previous worker ID are identical to each other and the update date and time associated with the delivery destination ID is later than a date and time of the previous delivery to the delivery destination associated with the delivery destination ID in the extracted delivery history information.

This configuration provides, in a case where the delivery destination peculiar information was updated in a period from a previous delivery to the delivery destination by the worker to a current date, the updated delivery destination peculiar information for the worker even when the worker ID at present and the previous worker ID are identical to each other. This thus allows the worker to deliver the article in consideration of the latest delivery destination peculiar information.

(9) In the information processing system according to any one of (1) to (8) above, the wearable device may further include a display part. The first control part may output the delivery destination peculiar information to the display part. The display part may display the delivery destination peculiar information in the visual field of the worker in an augmented reality manner.

In this configuration, the delivery destination peculiar information is output to the display part, and the display part displays the delivery destination peculiar information in the visual field of the worker in an augmented reality manner. The displaying allows the worker to confirm the delivery destination peculiar information while carrying the article.

(10) A delivery management method according to another aspect of the disclosure is a delivery management method for a delivery management server communicably connected to a wearable device attached to a head of a worker. The delivery management method includes: receiving an article ID and a worker ID identifying the worker from the wearable device that recognizes the article ID identifying an article being an operation object of the worker by image recognition processing of an image in a visual field of the worker captured by a camera and sends the recognized article ID and the worker ID; extracting delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another; determining whether the worker ID received at present is identical to a previous worker ID of a worker having previously delivered to the delivery destination associated with the delivery destination ID in the extracted delivery history information; extracting delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker are not identical to each other; and sending the extracted delivery destination peculiar information to the wearable device.

In this configuration, when a worker delivering an article to a delivery destination at present is not identical to a worker having previously delivered an article to the delivery destination, delivery destination peculiar information which is peculiar to the delivery destination and is about a delivery of an article is provided for the worker. When the worker delivering the article to the delivery destination at present and the worker having previously delivered the article to the delivery destination are identical to each other, the delivery destination peculiar information is not provided for the worker. This configuration thus enables provision of delivery destination peculiar information which is peculiar to a delivery destination and is a about a delivery only for a worker who needs the delivery destination peculiar information, and achieves improvement in a work efficiency of the worker.

(11) A wearable device according to another aspect of the present disclosure is a wearable device to be attached to a head of a worker, and includes: a camera; a control part: and a communication part. The camera captures an image in a visual field of the worker. The control part executes: acquiring the image captured by the camera; and recognizing an article ID identifying an article being an operation object of the worker by image recognition processing of the acquired image. The communication part is configured to: send the recognized article ID and a worker ID identifying the worker; and receive delivery destination peculiar information sent by the delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information. The control part outputs the received delivery destination peculiar information.

In this configuration, when a worker delivering an article to a delivery destination at present is not identical to a worker having previously delivered an article to the delivery destination, delivery destination peculiar information which is peculiar to the delivery destination and is about a delivery of an article is provided for the worker. When the worker delivering the article to the delivery destination at present and the worker having previously delivered the article to the delivery destination are identical to each other, the delivery destination peculiar information is not provided for the worker. This configuration thus enables provision of delivery destination peculiar information which is peculiar to a delivery destination and is a about a delivery only for a worker who needs the delivery destination peculiar information, and achieves improvement in a work efficiency of the worker.

Moreover, the disclosure can be realized as: a wearable device including the above-described distinctive configuration; and an information processing method executing distinctive ways each corresponding to the distinctive configuration of the wearable device. Additionally, the disclosure can be realized by a computer program causing a computer to execute the distinctive ways included in the information processing method. From these perspectives, the same advantageous effects as those of the wearable device are achievable in the following other aspects.

(12) An information processing method according to still another aspect of the present disclosure is an information processing method for a wearable device to be attached to a head of a worker. The information processing method includes: acquiring an image in a visual field of the worker captured by a camera; recognizing an article ID identifying an article being an operation object of the worker by image recognition processing of the acquired image; sending the recognized article ID and a worker ID identifying the worker; receiving delivery destination peculiar information sent by the delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information; and outputting the received delivery destination peculiar information.

(13) An information processing program according to still another aspect of the present disclosure includes: causing a computer to execute: acquiring an image in a visual field of the worker captured by a camera; recognizing an article ID identifying an article being an operation object of the worker by image recognition processing of the acquired image; sending the recognized article ID and a worker ID identifying the worker; receiving delivery destination peculiar information sent by the delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information; and outputting the received delivery destination peculiar information.

(14) A non-transitory computer readable medium according to still another aspect of the present disclosure stores an information processing program for causing a computer to execute processing including: acquiring an image in a visual field of the worker captured by a camera; recognizing an article ID identifying an article being an operation object of the worker by image recognition processing of the acquired image; sending the recognized article ID and a worker ID identifying the worker; receiving the article ID and the worker ID, extracting delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determining whether the worker ID received at present is identical to a previous worker ID of a worker having previously delivered to the delivery destination associated with the delivery destination ID in the extracted delivery history information, extracting delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker are not identical to each other, and receiving the extracted delivery destination peculiar information sent by the delivery management server; and outputting the received delivery destination peculiar information.

Embodiments of this disclosure will be described with reference to the accompanying drawings. It should be noted that each of the following embodiments illustrates one example of the disclosure, and does not delimit the technical scope of the disclosure.

First Embodiment

Figure 2:
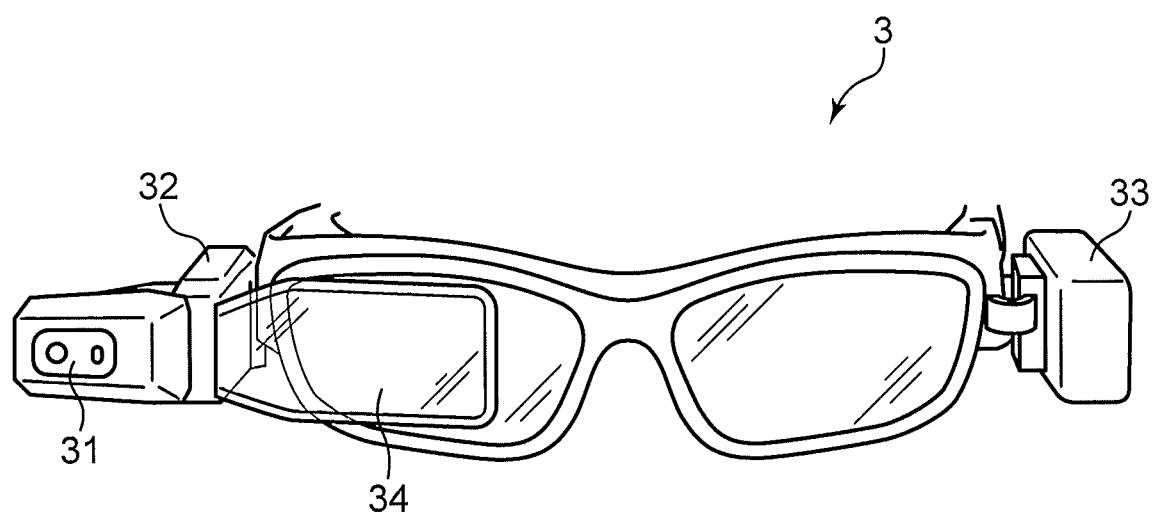
FIG. 2 is an illustration of an appearance of a smart glasses structure in the first embodiment of the disclosure.

FIG. 1 is a diagram showing an example of a configuration of a delivery system in a first embodiment of the present disclosure. FIG. 2 is an illustration of an appearance of a smart glasses structure 3 in the first embodiment of the disclosure. The delivery system shown in FIG. 1 includes a first terminal 1, a delivery management server 2, and the smart glasses structure 3.

The first terminal 1 includes, for example, a smartphone, a tablet computer, or a personal computer, and is used by a recipient of an article. The first terminal 1 includes a third control part 11, a touch screen 12, and a third communication part 13.

The third control part 11 includes, for example, a central processing unit (CPU), and controls an entirety of the first terminal 1. The third control part 11 causes the touch screen 12 to display a peculiar information input screen image for receiving delivery destination peculiar information which is peculiar to a delivery destination and is about a delivery of an article. The delivery destination peculiar information includes, for example, information about a treatment for absence of a recipient at the delivery destination. More specifically, the delivery destination peculiar information includes, for example, information indicating a place where the article is to be put in absence of the recipient. The delivery destination peculiar information will be described in detail later.

The touch screen 12 displays various kinds of information and receives an input manipulation by the recipient. The touch screen 12 receives the delivery destination peculiar information input by the recipient on the peculiar information input screen image. The recipient inputs the delivery destination peculiar information onto the touch screen 12.

When the touch screen 12 receives the input delivery destination peculiar information, the third communication part 13 sends a delivery destination ID identifying the delivery destination and the delivery destination peculiar information to the delivery management server 2. The first terminal 1 includes an unillustrated memory. The unillustrated memory stores the delivery destination ID in advance.

The smart glasses structure 3 is a wearable device in an eyeglasses shape to be attached to a head of a worker. The worker performs a work of delivering the article to the delivery destination. The worker performs the work with the smart glasses structure 3 on the head.

The smart glasses structure 3 shown in FIG. 1 and FIG. 2 includes a camera 31, a first control part 32, a first communication part 33, and a display part 34.

The camera 31 captures an image in a visual field of the worker. The camera 31 is provided to the right of a main body of the smart glasses structure 3 for capturing a scene in front of the worker wearing the smart glasses structure 3. A view angle and a focal distance of the camera 31 is set to be substantially the same as those in the visual field of the worker. An image acquired by the camera 31 shows a scenery which is substantially the same as a scenery viewed by the worker with a naked eye of the worker. The camera 31 outputs the captured image to the first control part 32.

The first control part 32 acquires the image captured by the camera 31. The first control part 32 recognizes an article ID identifying an article being an operation object of the worker by image recognition processing of the acquired image.

More specifically, the first control part 32 recognizes the article being the operation object of the worker and a hand of the worker by the image recognition processing of the acquired image. The first control part 32 determines, on the basis of a positional relation between the recognized article and the recognized hand, whether the worker is in processing of carrying the article. At this time, when the recognized article is located between a position of a recognized right hand of the worker and a position of a recognized left hand of the worker, the first control part 32 determines that the worker is in the processing of carrying the article. The article that is in the processing of being carried by the worker indicates an operation object that the worker starts to carry.

The first control part 32 recognizes the article ID identifying the article by the image recognition processing of the acquired image when determining that the worker is in the processing of carrying the article. The first control part 32 recognizes the article ID of the article located between the position of the recognized right hand of the worker and the position of the recognized left hand of the worker.

The first communication part 33 sends the article ID recognized by the first control part 32 and a worker ID identifying the worker to the delivery management server 2. The smart glasses structure 3 includes an unillustrated memory. The unillustrated memory stores the worker ID in advance. The camera 31 may capture an image of a barcode or a two-dimensional code indicating the worker ID, and the first control part 32 may read the worker ID from the barcode or the two-dimensional code shown in the captured image.

The first communication part 33 receives the delivery destination peculiar information sent by the delivery management server 2. The first control part 32 outputs the delivery destination peculiar information received by the first communication part 33. The first control part 32 outputs the delivery destination peculiar information to the display part 34.

The display part 34 includes a trans-reflective display and displays the delivery destination peculiar information in the visual field of the worker in an augmented reality manner. The display part 34 displays the delivery destination peculiar information, for example, in front of the right eye of the worker wearing the smart glasses structure 3.

The delivery management server 2 manages a delivery status of the article. The delivery management server 2 is communicably connected to each of the first terminal 1 and the smart glasses structure 3 via the network 4. The network 4 includes, for example, the internet.

The delivery management server 2 includes a second communication part 21, a memory 22, and a second control part 23.

The second communication part 21 receives the delivery destination ID and the delivery destination peculiar information sent by the first terminal 1. The second communication part 21 further receives the article ID and the worker ID sent by the smart glasses structure 3.

For instance, the memory 22 includes a storage device, such as a Random Access Memory (RAM), a Hard Disk Drive (HDD), a Solid State Drive (SSD), or a flash memory, for storing various kinds of information. The memory 22 stores delivery history information and delivery destination information.

The delivery history information associates article IDs, delivery destination IDs respectively identifying delivery destinations of articles, worker IDs identifying workers having delivered the articles to the delivery destinations, and delivery complete dates and times of the articles with one another. The delivery destination information associates the delivery destination IDs with delivery destination peculiar information which is peculiar to the delivery destinations respectively and is about the deliveries of the articles.

The second control part 23 causes the memory 22 to store delivery destination information associating the delivery destination ID and the delivery destination peculiar information received by the second communication part 21 with each other.

The second control part 23 extracts, from the memory 22, delivery history information associated with the delivery destination ID associated with the article ID received by the second communication part 21. The second control part 23 determines whether the worker ID received at present by the second communication part 21 is identical to a previous worker ID of a worker having previously delivered to the delivery destination associated with the delivery destination ID in the extracted delivery history information. The second control part 23 extracts delivery destination peculiar information associated with the delivery destination ID from the memory 22 when the worker ID received at present by the second communication part 21 and the previous worker ID are not identical to each other. The second control part 23 avoids extracting the delivery destination peculiar information associated with the delivery destination ID from the memory 22 when the worker ID received at present by the second communication part 21 and the previous worker ID are identical to each other.

The second communication part 21 sends the delivery destination peculiar information extracted by the second control part 23 to the smart glasses structure 3.

FIG. 3 is a table showing an example of delivery history information associated with a delivery destination ID associated with a received article ID in the first embodiment.

The delivery history information shown in FIG. 3 associates a delivery destination ID identifying a delivery destination, an article ID identifying an article, a delivery status showing a status of a delivery, a worker ID identifying a worker having delivered an article, a delivery complete date and time of the article, addressee information indicating a recipient's name of the article, and address information indicating a destination of the article with one another. Pieces of delivery history information shown in FIG. 3 are in order of newer information from the top of the table. The topmost delivery history information is associated with the article being delivered at present, and the second delivery history information from the top is associated with the previously delivered article.

For instance, when an article ID received from the smart glasses structure 3 indicates "7890-1234-56" and a delivery destination ID associated with the article ID indicates "378087", delivery history information associated with the delivery destination ID is extracted from the memory 22. It is determined whether a worker ID received at present from the smart glasses structure 3 is identical to a previous worker ID of a worker having previously delivered to a destination associated with the delivery destination ID in the extracted delivery history information. The previous worker ID indicates "549". When the worker ID at present indicates "549", the second control part 23 determines that the worker ID received at present and the previous worker ID are identical to each other. When the worker ID at present does not indicate "549", the second control part 23 determines that the worker ID received at present and the previous worker ID are not identical to each other.

FIG. 4 is a table showing an example of delivery destination information in the first embodiment.

The delivery destination information shown in FIG. 4 associates delivery destination IDs with delivery destination peculiar information respectively.

Each of the delivery destination IDs "378087" and "378088" is associated with delivery destination peculiar information indicating a treatment for absence of each associated recipient. The delivery destination peculiar information associated with the delivery destination ID "378087" indicates a place where an article is to be put in absence of the associated recipient. The delivery destination peculiar information associated with the delivery destination ID "378088" indicates a person to be confirmed with in absence of the associated recipient.

Each of the delivery destination IDs "378089", "378090", and "378091" is associated with delivery destination peculiar information indicating a way of delivering an article to each associated recipient. The delivery destination peculiar information associated with the delivery destination ID "378089" indicates a way of delivering an article in a case of a plurality of entrance doors at a delivery destination. The delivery destination peculiar information associated with the delivery destination ID "378090" indicates a way of delivering an article in a predetermined timeframe. The delivery destination peculiar information associated with the delivery destination ID "378091" indicates a timeframe in which the recipient is highly likely to be at home or at the destination.

The delivery destination peculiar information shown in FIG. 4 is just an example, and the present disclosure is not limited to the shown delivery destination peculiar information.

Subsequently, an information provision process by the delivery management server 2 and the smart glasses structure 3 in the first embodiment of the disclosure will be described.

Figure 5:
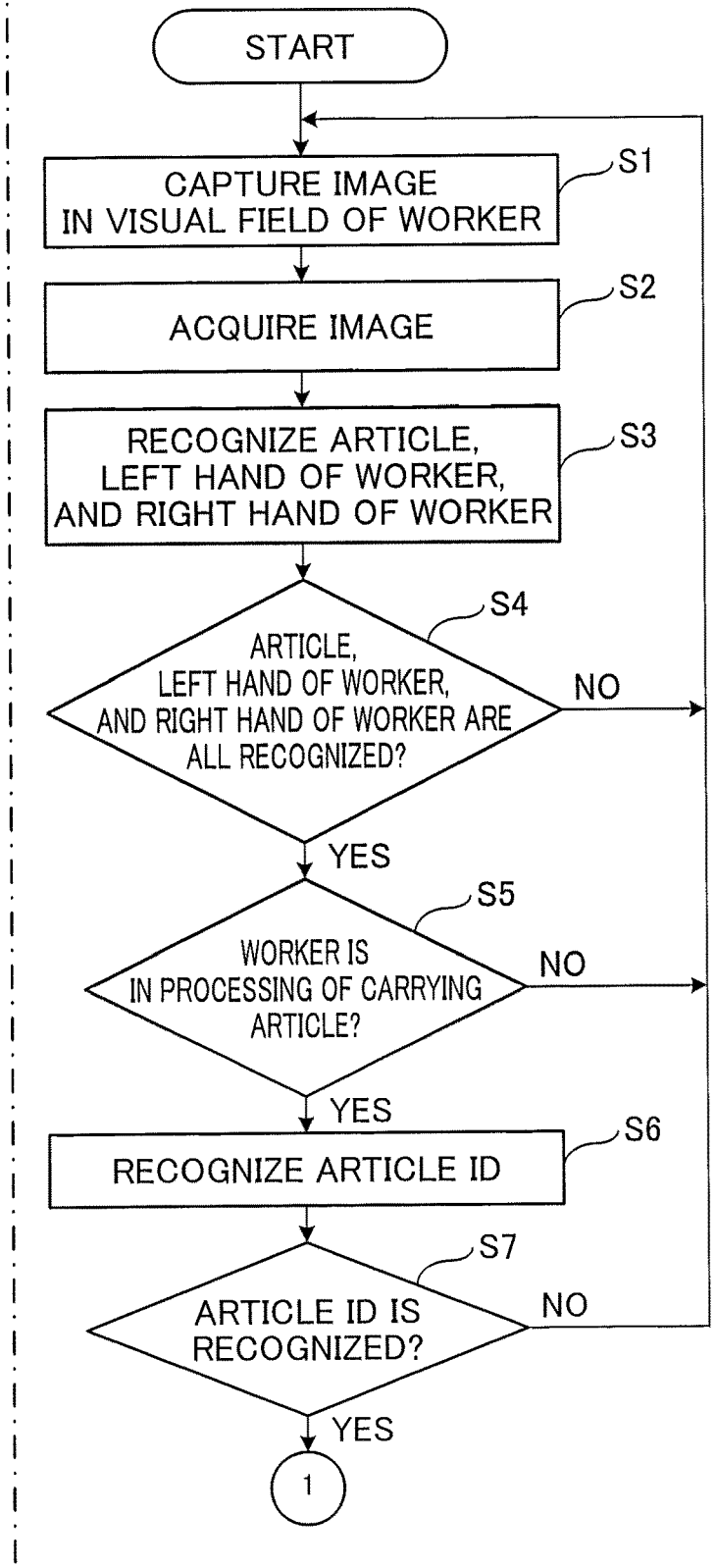
FIG. 5 is a first flowchart explaining an information provision process by a delivery management server and the smart glasses structure in the first embodiment of the disclosure.
Figure 6:
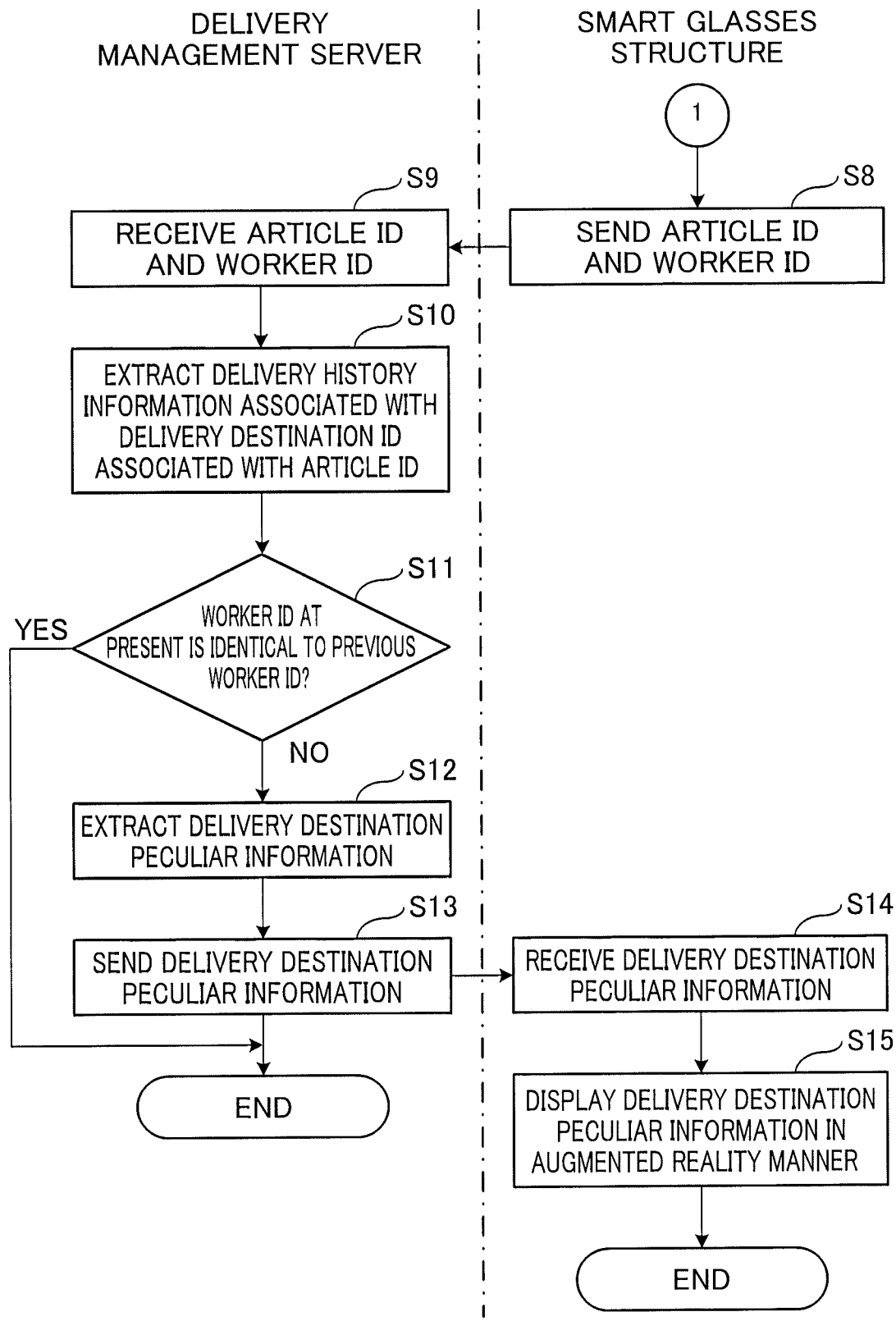
FIG. 6 is a second flowchart explaining the information provision process by the delivery management server and the smart glasses structure in the first embodiment of the disclosure.

FIG. 5 is a first flowchart explaining the information provision process by the delivery management server 2 and the smart glasses structure 3 in the first embodiment of the disclosure. FIG. 6 is a second flowchart explaining the information provision process by the delivery management server 2 and the smart glasses structure 3 in the first embodiment of the disclosure.

First, in step S1, the camera 31 captures an image in a visual field of a worker. The camera 31 continuously captures images in the visual field of the worker in a work of the worker.

Next, in step S2, the first control part 32 acquires, from the camera 31, the image in the visual field of the worker captured by the camera 31.

Subsequently, in step S3, the first control part 32 recognizes an article being an operation object of the worker, the left hand of the worker, and the right hand of the worker by image recognition processing of the acquired image.

Figure 7:
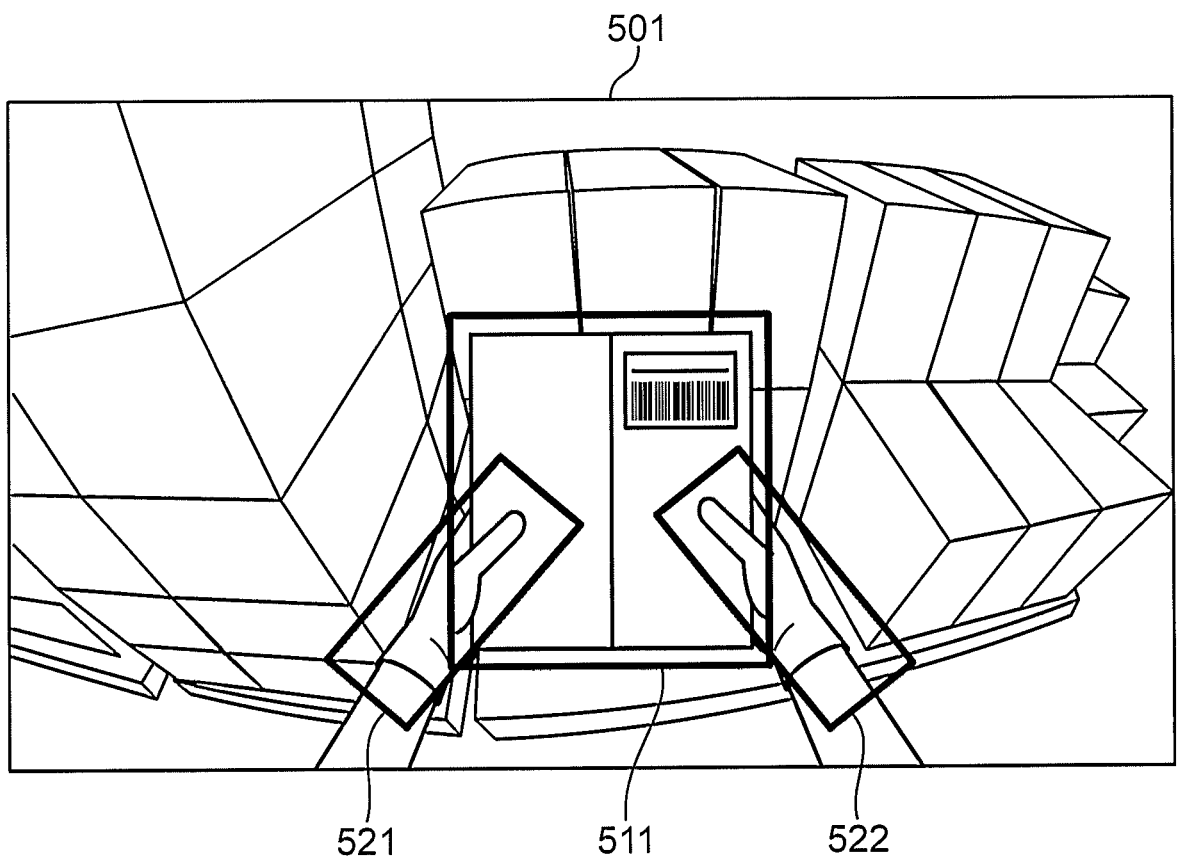
FIG. 7 is an illustration of an example of an image captured by a camera in processing of carrying an article by a worker.

FIG. 7 is an illustration of an example of the image captured by the camera 31 in processing of carrying the article by the worker.

The worker holds the article with both hands in carrying the article. At this time, the respective thumbs of the left hand and the right hand of the worker are on a top surface of the article, so that the article is located between the left hand the right hand of the worker. In other words, when the article is located between a position of the right hand of the worker and a position of the left hand of the worker, it can be determined that the worker is in processing of carrying the article.

The first control part 32 recognizes the article being the operation object of the worker, the left hand of the worker, and the right hand of the worker from the image captured by the camera 31. In FIG. 7, the article recognized from an image 501 is expressed with a rectangular frame line 511, the left hand of the worker recognized from the image 501 is expressed with a rectangular frame line 521, and the right hand of the worker recognized from the image 501 is expressed with a rectangular frame line 522.

The first control part 32 executes the image recognition processing by using an image recognition model obtained through machine learning in such a manner as to recognize the article, the left hand of the worker, and the right hand of the worker from the image. The first control part 32 inputs the image captured by the camera 31 into the image recognition model having undergone the machine learning and acquires a recognition result from the image recognition model. The recognition result shows the position of the article, the position of the left hand of the worker, and the position of the right hand of the worker on the image.

Examples of the machine learning include: supervised learning of learning a relation between input data and output data by using training data including input information which is given with a label (output information); unsupervised learning of establishing a structure of unlabeled data only based on input data; semi-supervised learning that uses both labeled data and unlabeled data; and reinforcement learning of learning an action to maximize cumulative reward through trial and error. Specific ways of the machine learning include a neural network (including deep learning using a multilayer neural network), genetic programming, a decision tree, the Bayesian network, and a support vector machine (SVM). The machine learning of the image recognition model may adopt any one of the aforementioned specific examples.

The first control part 32 may recognize each of the article, the left hand of the worker, and the right hand of the worker from the image by pattern matching.

Referring back to FIG. 5, subsequently, in step S4, the first control part 32 determines whether all the article, the left hand of the worker, and the right hand of the worker are recognized. When it is determined that one of the article, the left hand of the worker, and the right hand of the worker is recognized from the image, when it is determined that any two among the article, the left hand of the worker, and the right hand of the worker are recognized from the image, or when it is determined that all the article, the left hand of the worker, and the right hand of the worker are not recognized from the image (NO in step S4), the process returns to step S1.

By contrast, when it is determined that all the article, the left hand of the worker, and the right hand of the worker are recognized (YES in step S4), the first control part 32 determines, in step S5, whether the worker is in processing of carrying the article. At this time, when the recognized article is located between a position of the recognized right hand of the worker and a position of the recognized left hand of the worker, the first control part 32 determines that the worker is in the processing of carrying the article. The image 501 in FIG. 7 shows the article located between the position of the right hand of the worker and the position of the left hand of the worker, and thus, it is determined that the worker is in the processing of carrying the article. By contrast, when the recognized article is not located between the position of the recognized right hand of the worker and the position of the recognized left hand of the worker, the first control part 32 determines that the worker is not in the processing of carrying the article.

When it is determined that the worker is not in the processing of carrying the article (No in step S5), the process returns to step S1.

By contrast, when it is determined that the worker is in the processing of carrying the article (YES in step S5), the first control part 32 recognizes, in step S6, an article ID identifying the article by image recognition processing of the acquired image.

Figure 8:
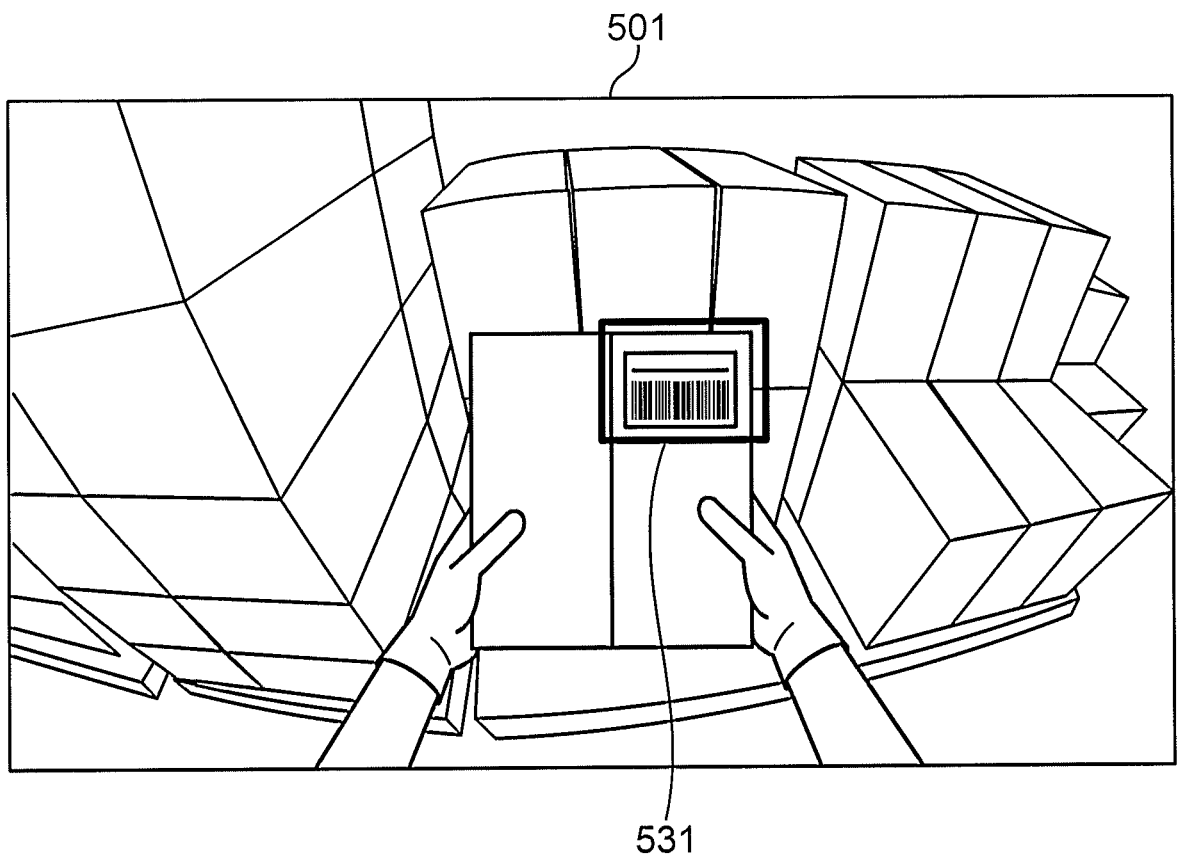
FIG. 8 is an illustration of an example of an image captured by the camera in recognition of an article ID.

FIG. 8 is an illustration of an example of an image captured by the camera 31 in recognition of the article ID.

A barcode indicating the article ID is attached to the top surface of the article. The first control part 32 recognizes the barcode of the article that is in the processing of being carried by the worker, i.e., the article being the operation object of the worker, from the image captured by the camera 31, and recognizes the article ID by reading the article ID from the recognized barcode. In FIG. 8, the barcode indicating the article ID recognized from the image 501 is expressed with a rectangular frame line 531.

Although the article ID is indicated by the barcode in the first embodiment, the present disclosure is not particularly limited to the barcode, the article ID may be indicated by a two-dimensional code. In this case, the first control part 32 may recognize the two-dimensional code from an image captured by the camera 31, and recognize the article ID by reading the article ID from the recognized two-dimensional code.

Referring back to FIG. 5, then, in step S7, the first control part 32 determines whether the article ID is recognized from the image. When it is determined that the article ID is not recognized from the image (NO in step S7), the process returns to step S1.

By contrast, when it is determined that the article ID is recognized from the image (YES in step S7), the first communication part 33 sends, to the delivery management server 2, the article ID recognized by the first control part 32 and a worker ID identifying the worker in step S8 in FIG. 6. The first control part 32 reads out the worker ID stored in the unillustrated memory.

Next, in step S9, the second communication part 21 of the delivery management server 2 receives the article ID and the worker ID sent by the smart glasses structure 3.

Subsequently, in step S10, the second control part 23 extracts, from the memory 22, delivery history information associated with a delivery destination ID associated with the article ID received by the second communication part 21.

Then, in step S11, the second control part 23 determines whether the worker ID received at present by the second communication part 21 is identical to a previous worker ID included in the delivery history information. When it is determined that the worker ID at present and the previous worker ID are identical to each other (YES in step S11), it is unnecessary to provide the worker with delivery destination peculiar information. Thus, the information provision process finishes.

By contrast, when it is determined that the worker ID at present and the previous worker ID are not identical to each other (NO in step S11), the second control part 23 extracts, in step S12, delivery destination peculiar information associated with the delivery destination ID from the memory 22.

Subsequently, in step S13, the second communication part 21 sends the delivery destination peculiar information extracted by the second control part 23 to the smart glasses structure 3.

Then, in step S14, the first communication part 33 of the smart glasses structure 3 receives the delivery destination peculiar information sent by the delivery management server 2. The first control part 32 outputs the received delivery destination peculiar information to the display part 34.

Next, in step S15, the display part 34 displays the delivery destination peculiar information in the visual field of the worker in an augmented reality manner.

Figure 9:
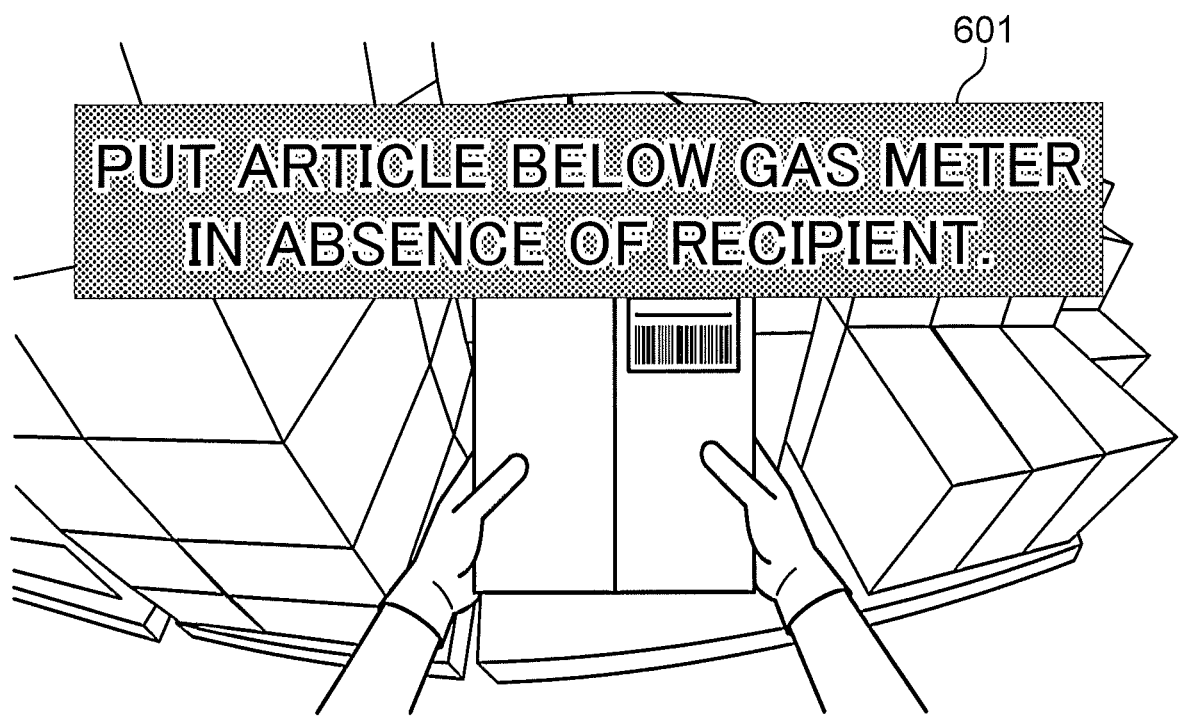
FIG. 9 is an illustration of an example of delivery destination peculiar information displayed on a display part of the smart glasses structure in the first embodiment.

FIG. 9 is an illustration of an example of the delivery destination peculiar information displayed on the display part 34 of the smart glasses structure 3 in the first embodiment.

Delivery destination peculiar information 601 in FIG. 9 shows characters to instruct putting of an article below a gas meter in absence of a recipient. The delivery destination peculiar information 601 is displayed in a reality environment viewed by the worker in an augmented reality manner. The displaying allows the worker to see the delivery destination peculiar information 601 and grasp a place where the article is to be put in absence of the recipient.

Conclusively, when a worker delivering an article to a delivery destination at present is not identical to a worker having previously delivered an article to the delivery destination, delivery destination peculiar information which is peculiar to the delivery destination and is about a delivery of an article is provided for the worker. When the worker delivering the article to the delivery destination at present and the worker having previously delivered the article to the delivery destination are identical to each other, the delivery destination peculiar information is not provided for the worker. This configuration thus enables provision of delivery destination peculiar information which is peculiar to a delivery destination and is a about a delivery only for a worker who needs the delivery destination peculiar information, and achieves improvement in a work efficiency of the worker.

Although the first terminal 1 carried by a recipient receives delivery destination peculiar information input by the recipient and sends the input delivery destination peculiar information to the delivery management server 2 in the first embodiment, this disclosure is not particularly limited to the sending way. A second terminal carried by a worker may receive delivery destination peculiar information input by the worker and send the input delivery destination peculiar information to the delivery management server 2. The second terminal includes, for example, a smartphone, a tablet computer, or an embedded device especially for a delivery work. In other words, an experienced worker having delivered articles to a specific delivery destination may already grasp delivery destination peculiar information which is peculiar to the specific delivery destination. The knowledge of the experienced worker is hence useful as the delivery destination peculiar information.

Although the information provision process finishes without sending delivery destination peculiar information when it is determined that a worker ID at present and a previous worker ID are identical to each other in step S11 in FIG. 6 in the first embodiment, this disclosure is not limited thereto. When it is determined that the worker ID at present and the previous worker ID are identical to each other, the second control part 23 may generate provision confirmation information for confirming with the worker whether the delivery destination peculiar information is to be provided, and may cause the second communication part 21 to send the generated provision confirmation information. The first control part 32 of the smart glasses structure 3 may cause, on receipt of the provision confirmation information by the first communication part 33, the display part 34 to display the received provision confirmation information in an augmented reality manner.

In this case, the display part 34 may display a message for confirming with the worker whether to display the delivery destination peculiar information, and may receive a selection by the worker as to whether to display the delivery destination peculiar information. For instance, the display part 34 may display, in an augmented reality, a provision confirmation image including a message saying, "Delivery destination peculiar information is to be displayed?", a first button image to select displaying of the delivery destination peculiar information, and a second button image to decline the displaying of the delivery destination peculiar information.

The first control part 32 determines whether the displaying of the delivery destination peculiar information is selected by the worker. The worker puts a finger thereof on the first button image on the provision confirmation image displayed on the display part 34 in the augmented reality manner to express a wish for the displaying of the delivery destination peculiar information. The worker puts the finger thereof on the second button image on the provision confirmation image displayed on the display part 34 in the augmented reality manner to express no wish for the displaying of the delivery destination peculiar information. The first control part 32 recognizes, on an image captured by the camera 31, positions of the first button image and the second button image on the provision confirmation image. The first control part 32 recognizes the finger of the worker from the image captured by the camera 31, and determines which of the first button image and the second button image is selected by the worker with the finger.

In a configuration in which the smart glasses structure 3 further includes a sightline direction detector that detects a sightline direction of the worker, the first control part 32 may determine whether the sightline direction detected by the sightline direction detector meets a direction of one of the first button image and the second button image, and may determine which of the first button image and the second button image is selected by the worker.

The smart glasses structure 3 may include a lid detector that detects a movement of lids of both eyes of the worker. In this case, when the lid detector detects a predetermined number of closing times (e.g., twice) of the right eye or more times, the first control part 32 may determine that the worker selects the first button image. When the lid detector detects a predetermined number of closing times (e.g., twice) of the left eye or more times, the first control part 32 may determine that the worker selects the second button image.

The first control part 32 may recognize a movement of a hand of the worker from an image captured by the camera 31. In this case, the first control part 32 may determine that the worker selects the first button image in recognition of an affirmative hand movement of the worker and may determine that the worker selects the second button image in recognition of a negative hand movement of the worker. Examples of the affirmative hand movement include a movement of forming a circle with both hands or with fingers of one hand of the worker. Examples of the negative hand movement include a movement of forming an "X"-shape with fingers of both hands of the worker and a movement of waving one hand sideways.

The smart glasses structure 3 may include a movement detector that detects a vertical movement of the head of the worker in a tilt direction and detects a horizontal movement of the head of the worker in a pan direction. In this case, when the movement detector detects a predetermined number of vertical movements (e.g., twice) of the head of the worker or more, the first control part 32 determines that the worker selects the first button image. By contrast, when the movement detector detects a predetermined number of horizontal movements (e.g., twice) of the head of the worker or more, the first control part 32 determines that the worker selects the second button image.

The smart glasses structure 3 may include a first button for receiving an affirmative replay input by the worker and a second button for receiving a negative reply input by the worker. For instance, the first button may be arranged at a right portion of a frame of the smart glasses structure 3 and the second button may be arranged at a left portion of the frame of the smart glasses structure 3. In this case, the first control part 32 may determine that the worker selects the first button image in response to pushing of the first button by the worker and may determine that the worker selects the second button image in response to pushing of the second button by the worker.

As described heretofore, it is confirmed with a worker whether to provide delivery destination peculiar information even when a worker ID at present and a previous worker ID are identical to each other. This configuration enables provision of delivery destination peculiar information for a worker who has delivered no article to a certain delivery destination for a long time period or has delivered to the delivery destination once or a few times.

Second Embodiment

In the first embodiment, an information provision process finishes when a worker ID at present and a previous worker ID are identical to each other. By contrast, in a second embodiment, it is determined whether a predetermined day or more days have elapsed from a date of a previous delivery to a delivery destination associated with a delivery destination ID in extracted delivery history information when a worker ID at present and a previous worker ID are identical to each other.

Figure 10:
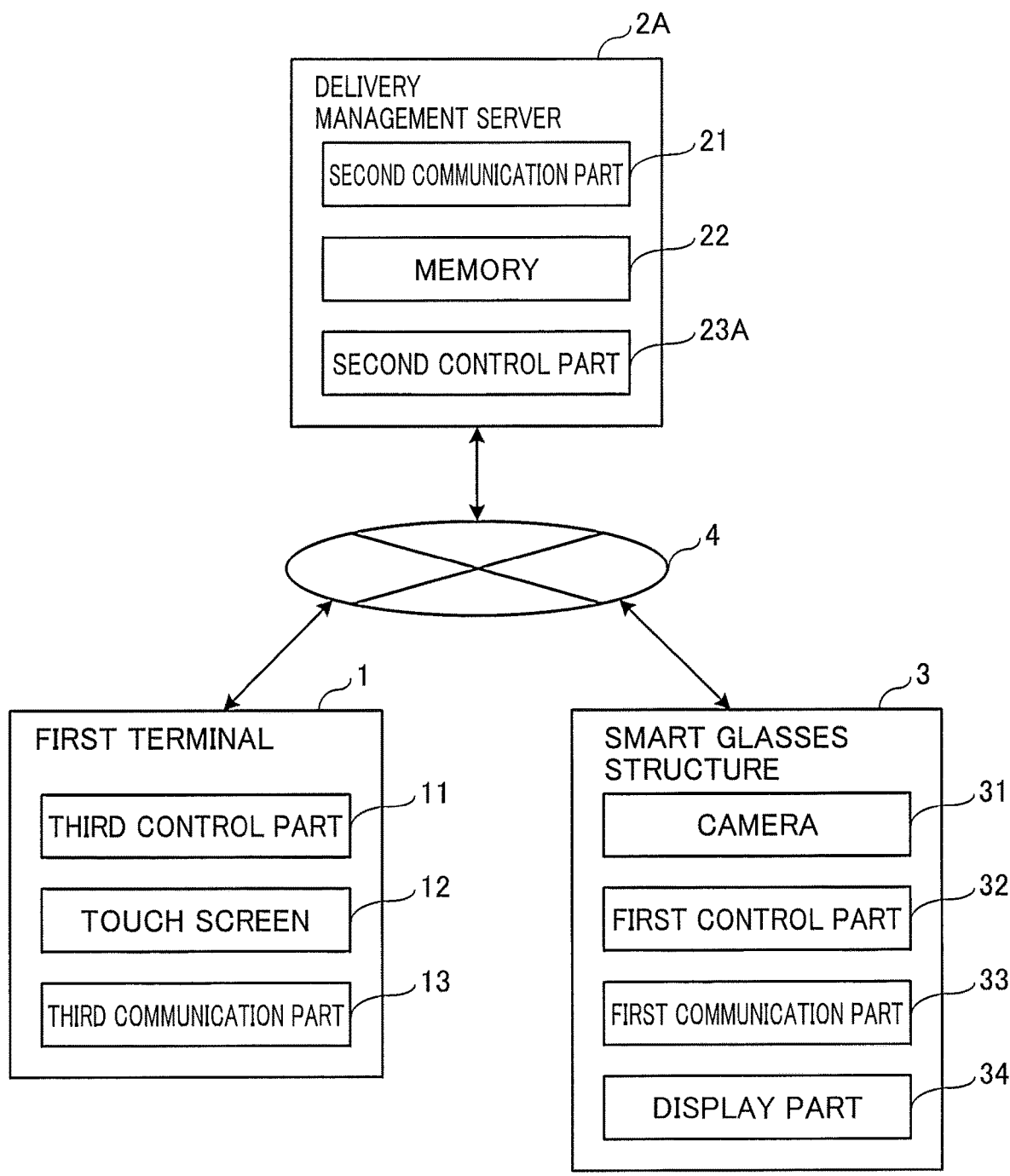
FIG. 10 is a diagram showing an example of a configuration of a delivery system in a second embodiment of the present disclosure.

FIG. 10 is a diagram showing an example of a configuration of a delivery system in the second embodiment of the present disclosure. The delivery system shown in FIG. 10 includes a first terminal 1, a delivery management server 2A, and a smart glasses structure 3. In the second embodiment, elements which are the same as those in the first embodiment are given the same reference signs and numerals, and thus, descriptions therefor will be omitted.

The delivery management server 2A includes a second communication part 21, a memory 22, and a second control part 23A.

The second control part 23A extracts, from the memory 22, delivery history information associated with a delivery destination ID associated with an article ID received by the second communication part 21. The second control part 23A determines whether a worker ID received at present by the second communication part 21 is identical to a previous worker ID of a worker having previously delivered to a delivery destination associated with the delivery destination ID in the extracted delivery history information. The second control part 23A extracts delivery destination peculiar information associated with the delivery destination ID from the memory 22 when the worker ID received at present by the second communication part 21 and the previous worker ID are not identical to each other.

The second control part 23A determines whether a predetermined day or more days have elapsed from a date of the previous delivery to the delivery destination associated with the delivery destination ID in the extracted delivery history information when the worker ID received at present and the previous worker ID are identical to each other. The second control part 23A extracts the delivery destination peculiar information associated with the delivery destination ID from the memory 22 in a case where the predetermined day or more days have elapsed from the date of the previous delivery. The second control part 23A avoids extracting the delivery destination peculiar information associated with the delivery destination ID from the memory 22 in a case where the predetermined day or more days have not elapsed from the date of the previous delivery.

Subsequently, an information provision process by the delivery management server 2A and the smart glasses structure 3 in the second embodiment of the disclosure will be described.

Figure 11:
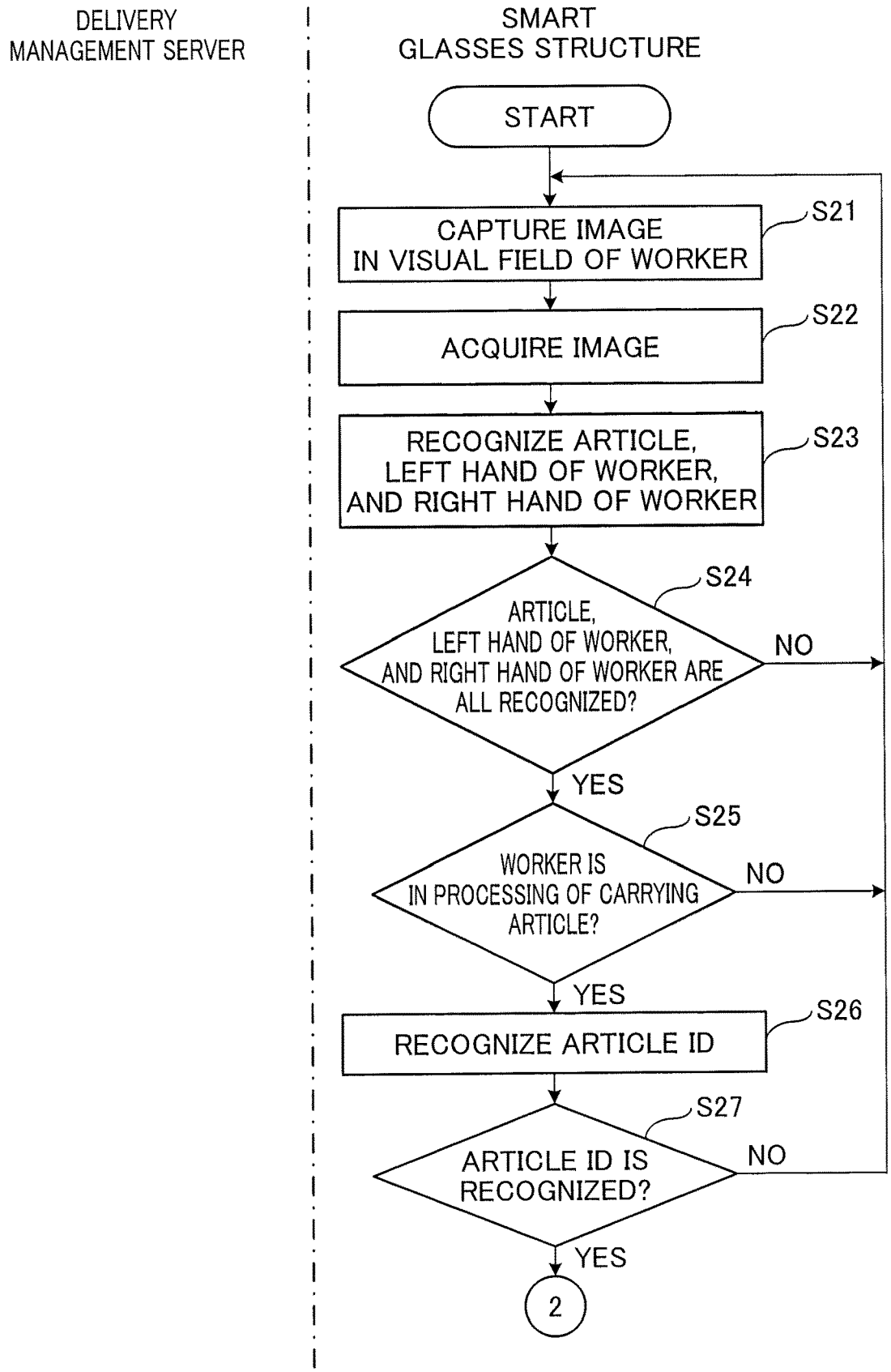
FIG. 11 is a first flowchart explaining an information provision process by a delivery management server and a smart glasses structure in the second embodiment of the disclosure.
Figure 12:
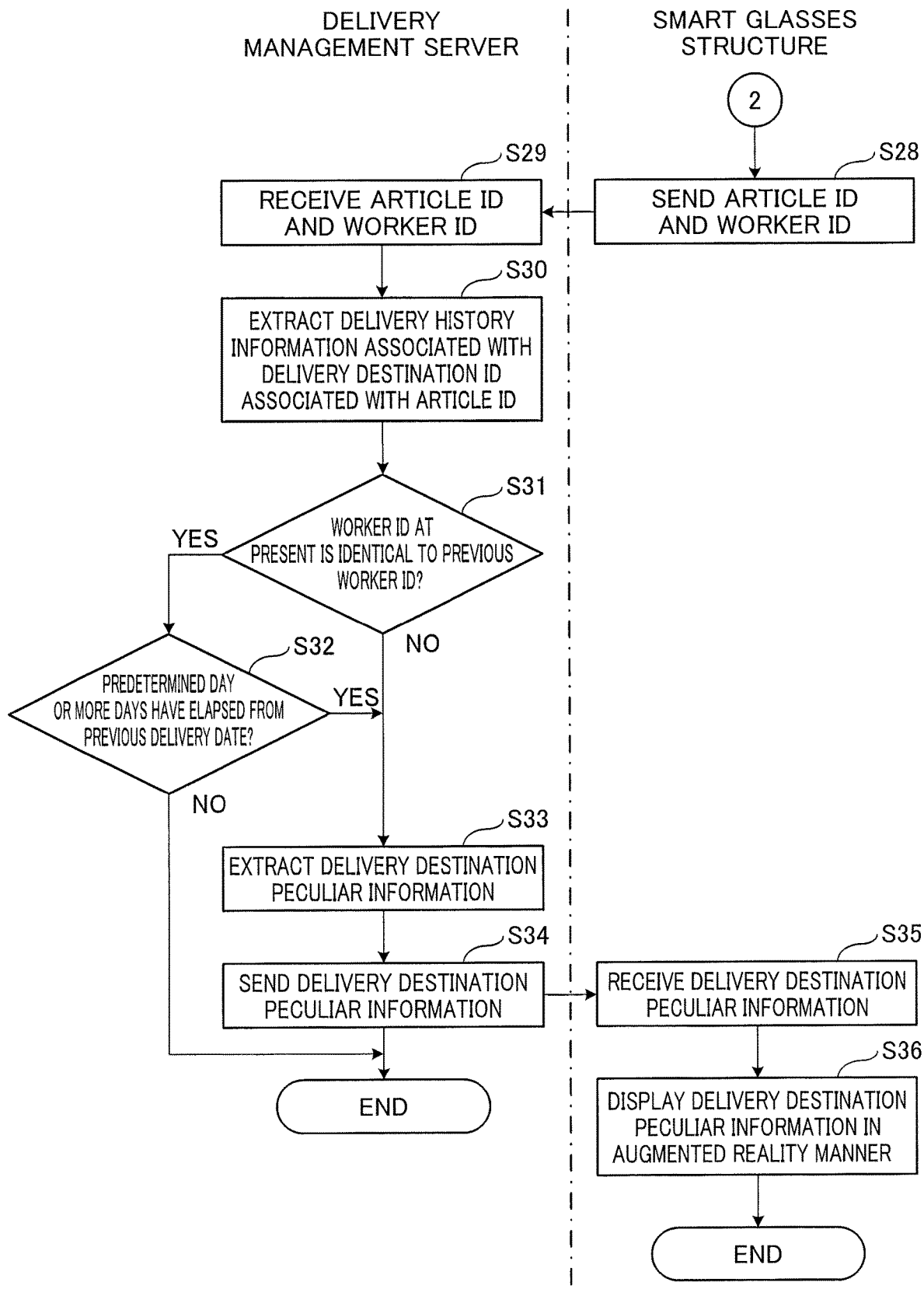
FIG. 12 is a second flowchart explaining the information provision process by the delivery management server and the smart glasses structure in the second embodiment of the disclosure.

FIG. 11 is a first flowchart explaining the information provision process by the delivery management server 2A and the smart glasses structure 3 in the second embodiment of the disclosure. FIG. 12 is a second flowchart explaining the information provision process by the delivery management server 2A and the smart glasses structure 3 in the second embodiment of the disclosure.

Step S21 to step S30 in FIG. 11 and FIG. 12 are the same as step S1 to step S10 in FIG. 5 and FIG. 6, and thus, descriptions therefor will be omitted.

Then, in step S31, the second control part 23A determines whether a worker ID received at present by the second communication part 21 is identical to a previous worker ID included in delivery history information. When it is determined that the worker ID at present and the previous worker ID are identical to each other (YES in step S31), the second control part 23A determines, in step S32, whether a predetermined day or more days have elapsed from a date of a previous delivery to a delivery destination associated with a delivery destination ID in the extracted delivery history information.

When it is determined that the predetermined day or more days have not elapsed from the date of the previous delivery to the delivery destination associated with the delivery destination ID (NO in step S32), the information provision process finishes owing to non-necessity of providing the delivery destination peculiar information for the worker.

By contrast, when it is determined that the predetermined day or more days have elapsed from the date of the previous delivery to the delivery destination associated with the delivery destination ID (YES in step S32) or when the worker ID at present and the previous worker ID are not identical to each other (NO in step S31), the second control part 23A extracts, in step S33, the delivery destination peculiar information associated with the delivery destination ID from the memory 22.

Step S34 to step S36 in FIG. 12 are the same as step S13 to step S15 in FIG. 6, and thus, descriptions therefor will be omitted.

For example, a worker who has delivered no article to a delivery destination for a long time period since a previous delivery may not remember delivery destination peculiar information which is peculiar to the delivery destination. In this regard, even when the worker delivering the article to the delivery destination at present is identical to a worker having previously delivered an article to the delivery destination, the configuration in the second embodiment provides the worker with the delivery destination peculiar information in a case where a predetermined day or more days have elapsed from a date of the previous delivery by the worker to a current date. This allows the worker having delivered no article for the long time period since the previous delivery to confirm the delivery destination peculiar information, and thus succeeds in reducing a delivery failure including necessity of redelivery and achieves improvement in a delivery efficiency.

The predetermined day or more days to be compared with an elapsed day or more days from the date of the previous delivery may be set for each worker, may be set for each company or office where each worker works, or may be set for an area for which each worker is responsible. A survey about a memory or an ability to remember things of a worker may be conducted. The second control part 23A may adjust the number of predetermined days for a worker having a reply of a good memory to be smaller than the number of predetermined days for a worker having a reply of a poor memory. The memory 22 stores the number of predetermined days in association with each worker ID.

In the second embodiment, the second control part 23A may determine whether the number of past deliveries to the delivery destination associated with the delivery destination ID in the extracted delivery history information falls within a predetermined number of deliveries when the worker ID received at present and the previous worker ID are identical to each other. The second control part 23A may extract the delivery destination peculiar information associated with the delivery destination ID from the memory 22 when the number of past deliveries falls within the predetermined number of deliveries. The second control part 23A may avoid extracting the delivery destination peculiar information from the memory 22 when the number of past deliveries exceeds the predetermined number of deliveries.

The predetermined number of deliveries to be compared with the number of past deliveries may be set for each worker, may be set for each company or office where each worker works, or may be set for an area for which each worker is responsible. A survey about a memory or an ability to remember things of a worker may be conducted. The second control part 23A may adjust the predetermined number of deliveries for a worker having a reply of a good memory to be smaller than the predetermined number of deliveries for a worker having a replay of a poor memory. The memory 22 stores the predetermined number of deliveries in association with each worker ID.

For instance, a worker having a smaller number of past deliveries to a delivery destination may not remember delivery destination peculiar information which is peculiar to the delivery destination. In this regard, even when the worker delivering the article to the delivery destination at present is identical to a worker having previously delivered an article to the delivery destination, this modification of the second embodiment provides the worker with the delivery destination peculiar information in a case where the number of past deliveries by the worker falls within a predetermined number of deliveries. This allows the worker having the smaller number of past deliveries to the delivery destination to confirm the delivery destination peculiar information, and thus succeeds in reducing a delivery failure including necessity of redelivery and achieves improvement in a delivery efficiency.

Third Embodiment

In the first embodiment, a smart glasses structure outputs, on receipt of delivery destination peculiar information, the received delivery destination peculiar information to a display part. By contrast, in a third embodiment, a smart glasses structure determines whether a recipient is absent at a delivery destination after receiving delivery destination peculiar information, and outputs the received delivery destination peculiar information to a display part when the recipient is absent at the delivery destination.

Figure 13:
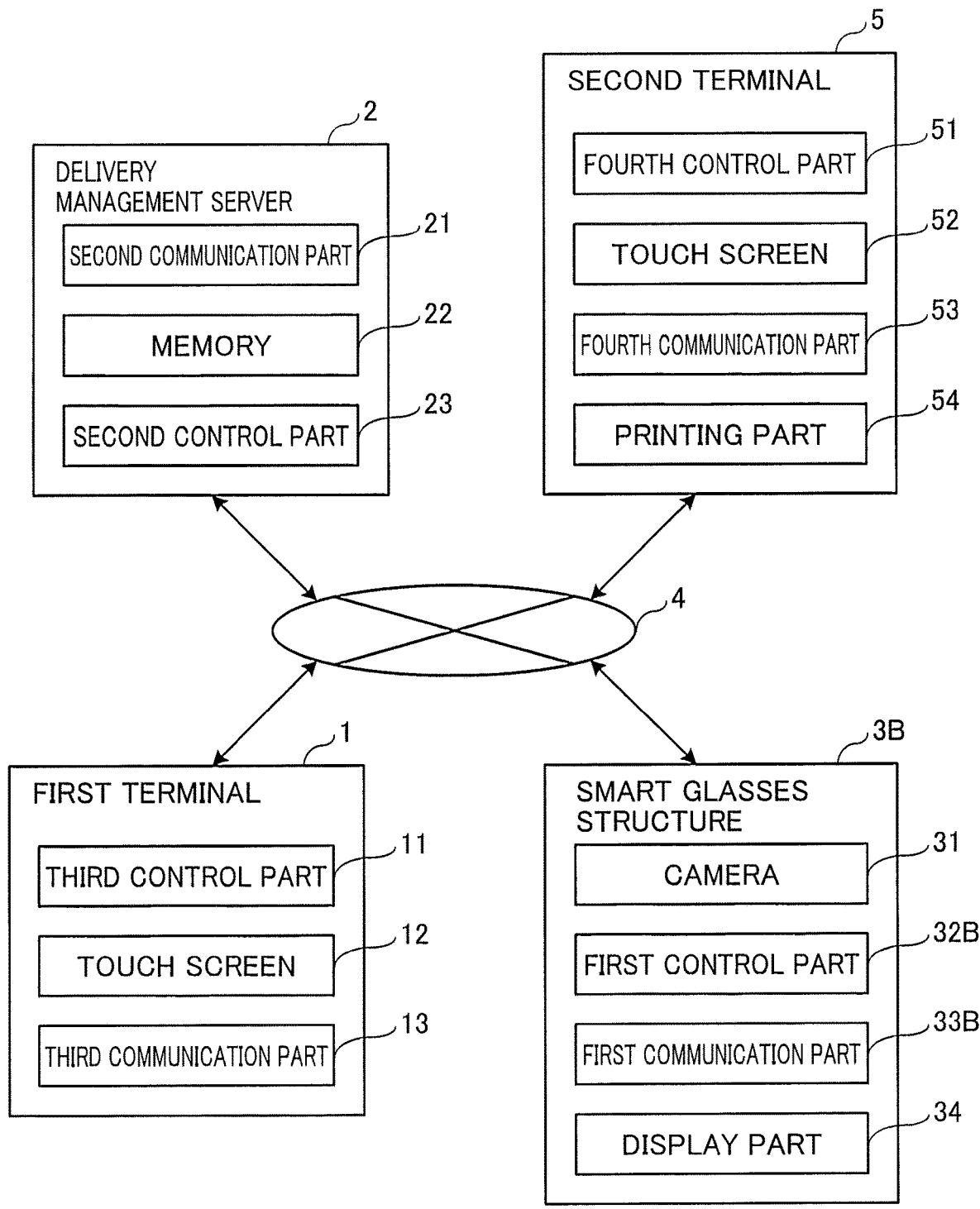
FIG. 13 is a diagram showing an example of a configuration of a delivery system in a third embodiment of the present disclosure.

FIG. 13 is a diagram showing an example of a configuration of a delivery system in the third embodiment of the present disclosure. The delivery system shown in FIG. 13 includes a first terminal 1, a delivery management server 2, a smart glasses structure 3B, and a second terminal 5.

The second terminal 5 includes, for example, a smartphone, a tablet computer, or an embedded device especially for a delivery work, and is used by a worker. The second terminal 5 is communicably connected to the smart glasses structure 3B. The second terminal 5 includes a fourth control part 51, a touch screen 52, a fourth communication part 53, and a printing part 54.

The second terminal 5 outputs a delivery notice informing a recipient that a worker brings an article back due to absence of the recipient at a delivery destination. The second terminal 5 serves as an example of an information terminal.

The touch screen 52 receives a generation instruction of generating a delivery notice from the worker. The worker inputs the generation instruction of the delivery notice by using the touch screen 52 when the recipient is absent at the delivery destination.

The fourth control part 51 generates the delivery notice when the touch screen 52 receives the generation instruction of the delivery notice. For instance, the delivery notice includes an article ID, a date and time at which the worker visited the delivery destination, and contact information about the worker. The fourth control part 51 outputs the generated delivery notice to the printing part 54. The fourth control part 51 generates a delivery notice output notification when outputting the delivery notice, and outputs the generated delivery notice output notification to the fourth communication part 53.

The fourth communication part 53 outputs the delivery notice output notification generated by the fourth control part 51 to the smart glasses structure 3B.

The printing part 54 prints the delivery notice generated by the fourth control part 51. The worker puts the printed delivery notice into a mailbox at the delivery destination, the delivery notice showing bringing-back of the article or a completed delivery based on delivery destination peculiar information.

The smart glasses structure 3B includes a camera 31, a first control part 32B, a first communication part 33B, and a display part 34.

The first communication part 33B receives the delivery notice output notification sent by the second terminal 5.

The first control part 32B determines whether the recipient is absent at the delivery destination after the receiving delivery destination peculiar information. The first control part 32B determines that the recipient is absent at the delivery destination when the first communication part 33B receives the delivery notice output notification. The first control part 32B outputs the received delivery destination peculiar information to the display part 34 when the recipient is absent at the delivery destination.

The first control part 32B causes an unillustrated memory to store the delivery destination peculiar information after receiving the delivery destination peculiar information. The first control part 32B generates notification information for notifying the worker of existence of the delivery destination peculiar information, and outputs the generated notification information to the display part 34. The display part 34 displays the notification information output by the first control part 32B in an augmented reality manner.

Subsequently, an information provision process by the delivery management server 2 and the smart glasses structure 3B in the third embodiment of the disclosure will be described.

Figure 14:
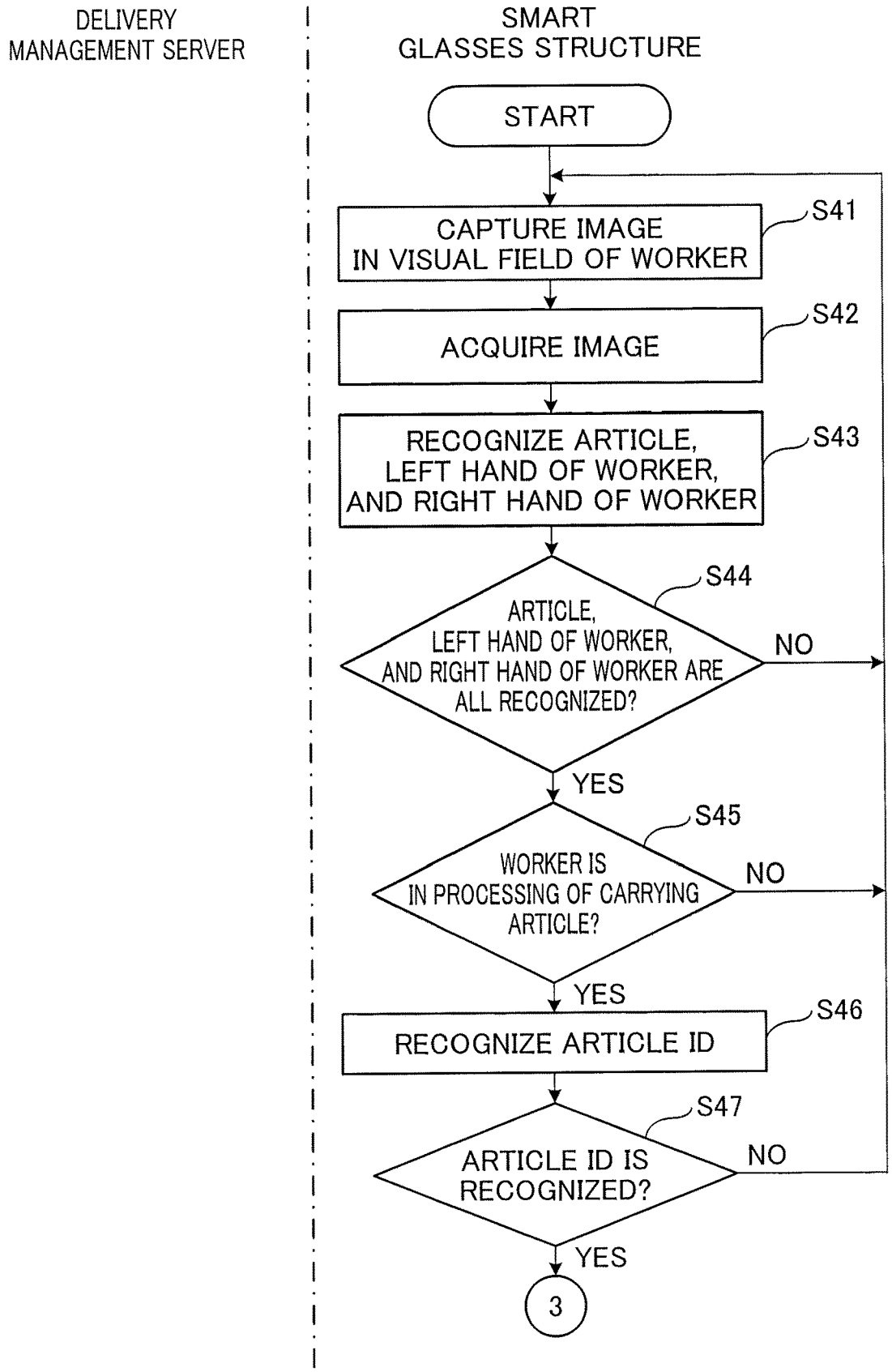
FIG. 14 is a first flowchart explaining an information provision process by a delivery management server and a smart glasses structure in the third embodiment of the disclosure.
Figure 15:
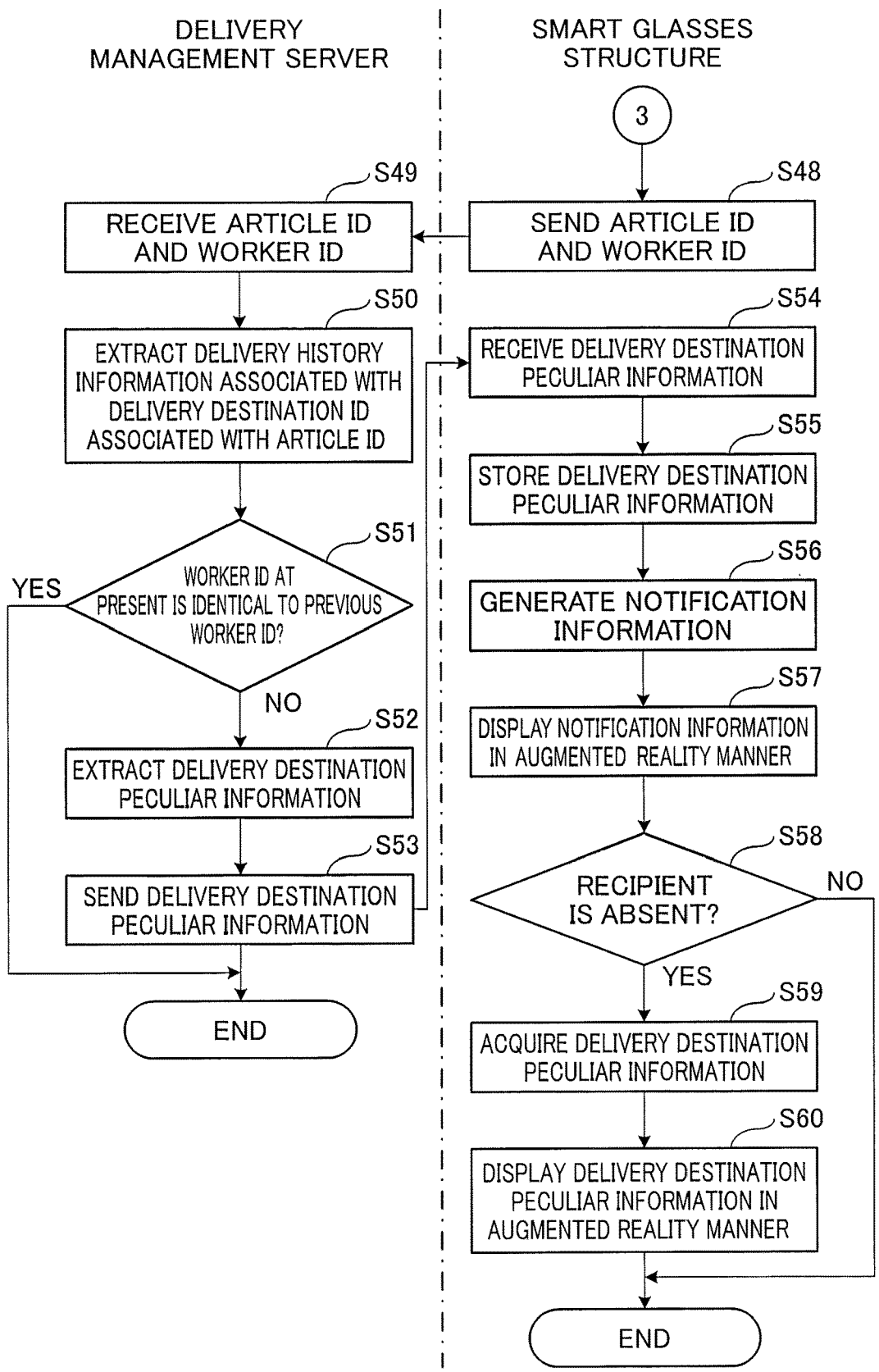
FIG. 15 is a second flowchart explaining the information provision process by the delivery management server and the smart glasses structure in the third embodiment of the disclosure.

FIG. 14 is a first flowchart explaining the information provision process by the delivery management server 2 and the smart glasses structure 3B in the third embodiment of the disclosure. FIG. 15 is a second flowchart explaining the information provision process by the delivery management server 2 and the smart glasses structure 3B in the third embodiment of the disclosure.

Step S41 to step S54 in FIG. 14 and FIG. 15 are the same as step S1 to step S14 in FIG. 5 and FIG. 6, and thus, descriptions therefor will be omitted.

Next, in step S55, the first control part 32B causes the unillustrated memory to store delivery destination peculiar information received by the first communication part 33B.

Subsequently, in step S56, the first control part 32B generates notification information for notifying a worker of existence of delivery destination peculiar information.

Then, in step S57, the display part 34 displays the notification information generated by the first control part 32B in an augmented reality manner. The displaying allows the worker to recognize the existence of the delivery destination peculiar information in processing of carrying the article. The notification information may be displayed only for a predetermined time period, e.g., five seconds.

Figure 16:
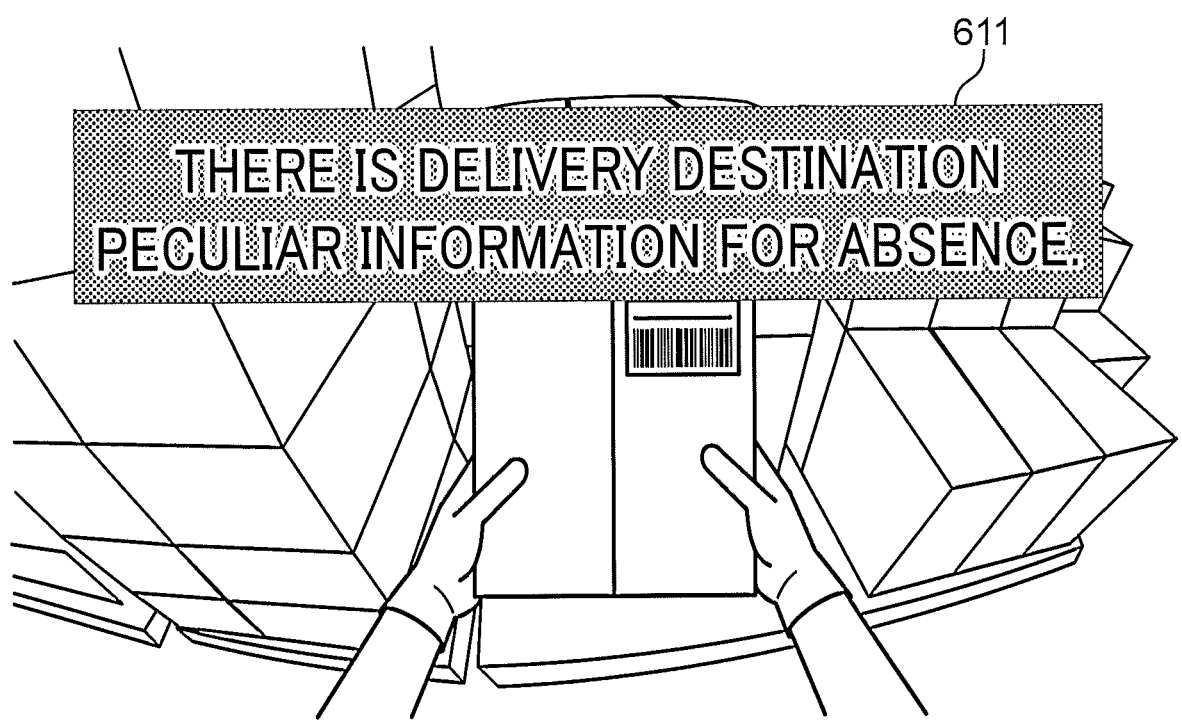
FIG. 16 is an illustration of an example of notification information displayed on a display part of the smart glasses structure in the third embodiment.

FIG. 16 is an illustration of an example of the notification information displayed on the display part 34 of the smart glasses structure 3B in the third embodiment.

Notification information 611 in FIG. 16 shows characters indicating existence of delivery destination peculiar information for absence. The notification information 611 is displayed in a reality environment viewed by the worker in an augmented reality manner. The displaying allows the worker to see the notification information 611 and grasp the existence of the delivery destination peculiar information for absence of a recipient.

Referring back to FIG. 15, subsequently, in step S58, the first control part 32B determines whether the recipient is absent at the delivery destination. The first control part 32B determines that the recipient is absent at the delivery destination when the first communication part 33B receives a delivery notice output notification. The first control part 32B determines that the recipient is at the delivery destination when the first communication part 33B receives no delivery notice output notification.

When it is determined that the recipient is not absent at the delivery destination (No in step S58), the information provision process finishes owing to non-necessity of providing the delivery destination peculiar information for the worker.

By contrast, when it is determined that the recipient is absent at the delivery destination (YES in step S58), the first control part 32B acquires, in step S59, delivery destination peculiar information from the unillustrated memory. The first control part 32B outputs the acquired delivery destination peculiar information to the display part 34.

Next, in step S60, the display part 34 displays the delivery destination peculiar information in the visual field of the worker in an augmented reality manner.

Conclusively, it is determined whether a recipient is absent at a delivery destination after receiving delivery destination peculiar information. The received delivery destination peculiar information is output in absence of the recipient at the delivery destination. The delivery destination peculiar information is hence provided for a worker at determination of absence of the recipient at the delivery destination, and thus, the delivery destination peculiar information can be provided for the worker at an appropriate time.

Although notification information for notifying a worker of existence of delivery destination peculiar information is displayed in the third embodiment, the present disclosure is not particularly limited thereto, and the notification information may not be displayed.

Although the first control part 32B determines that a recipient is absent at a delivery destination when receiving a delivery notice output notification from the second terminal 5 in the third embodiment, the present disclosure is not particularly limited thereto. The first control part 32B may recognize pressing of an intercom at a delivery destination by a worker by image recognition processing of an image acquired by the camera 31. The first control part 32B may determine that a recipient at the delivery destination is absent when no person is recognized by image recognition processing even after a lapse of a predetermined time period from the recognition of the pressing of the intercom at the delivery destination by the worker. The smart glasses structure 3B may further include a microphone. The first control part 32B may recognize a sound acquired by the microphone and detect the pressing of the intercom at the delivery destination by the worker.

Fourth Embodiment

In the first embodiment, an information provision process finishes when a worker ID at present and a previous worker ID are identical to each other. By contrast, in a fourth embodiment, it may be determined whether an update date and time at which delivery destination peculiar information was updated is later than a date and time of a previous delivery to a delivery destination associated with a delivery destination ID in extracted delivery history information when a worker ID at present and a previous worker ID are identical to each other.

Figure 17:
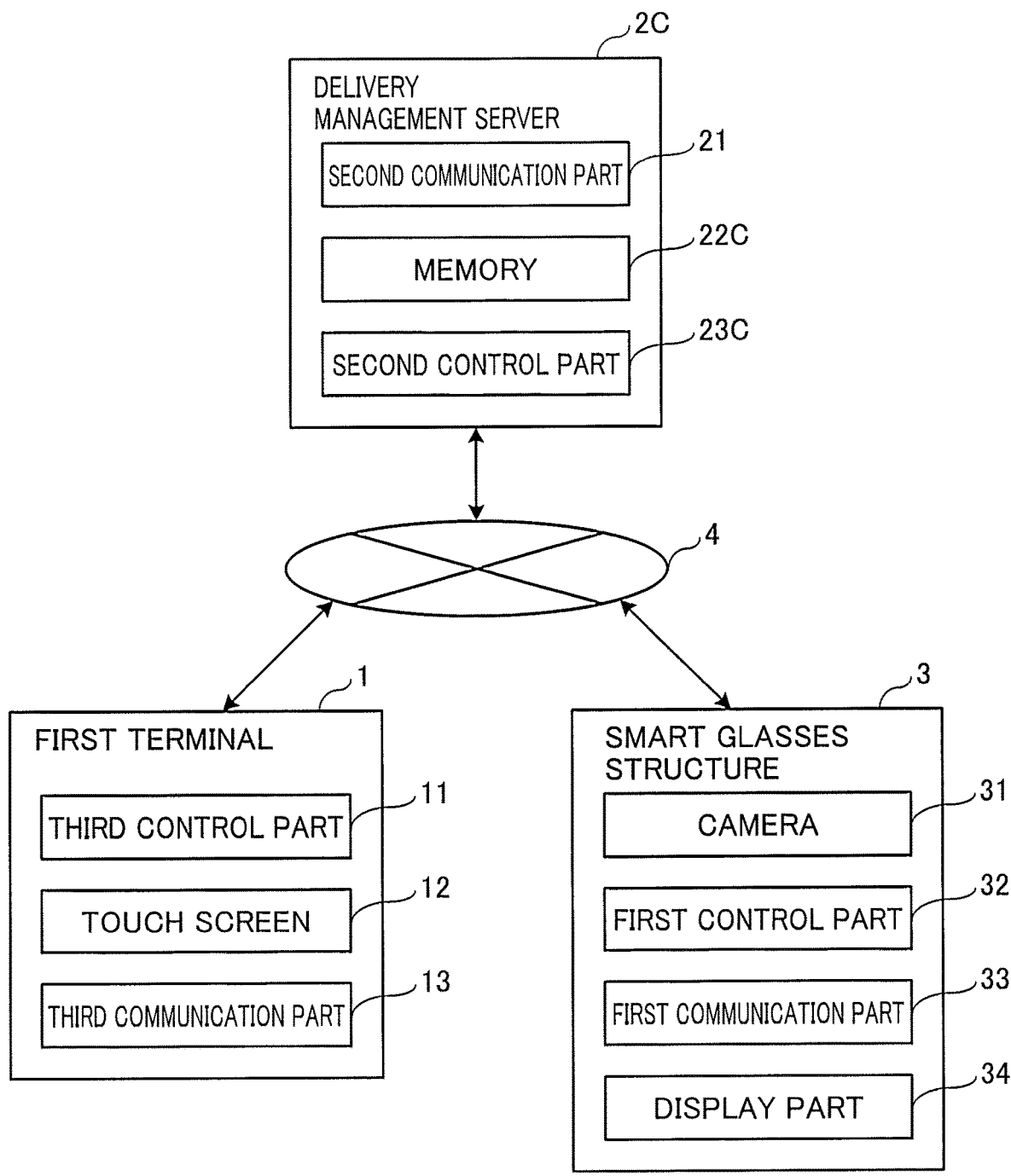
FIG. 17 is a diagram showing an example of a configuration of a delivery system in a fourth embodiment of the present disclosure.

FIG. 17 is a diagram showing an example of a configuration of a delivery system in the fourth embodiment of the present disclosure. A delivery system shown in FIG. 17 includes a first terminal 1, a delivery management server 2C, and a smart glasses structure 3. In the fourth embodiment, elements which are the same as those in the first embodiment are given the same reference signs and numerals, and thus, descriptions therefor will be omitted.

The delivery management server 2C includes a second communication part 21, a memory 22C, and a second control part 23C.

The memory 22C stores delivery history information and delivery destination information. The delivery destination information in the fourth embodiment associates delivery destination IDs, delivery destination peculiar information, and update dates and times at which the delivery destination peculiar information was updated with one another.

The second control part 23C extracts delivery destination peculiar information associated with a delivery destination ID from the memory 22C, when a worker ID received at present and a previous worker ID are identical to each other and an update date and time associated with the delivery destination ID is later than a date and time of a previous delivery to a delivery destination associated with the delivery destination ID in the extracted delivery history information.

Specifically, the second control part 23C determines whether the update date and time associated with the delivery destination ID is later than the date and time of the previous delivery to the delivery destination associated with the delivery destination ID in the extracted delivery history information when the worker ID received at present and the previous worker ID are identical to each other. The second control part 23C extracts delivery destination peculiar information associated with the delivery destination ID from the memory 22C when the update date and time associated with the delivery destination ID is later than the date and time of the previous delivery to the delivery destination associated with the delivery destination ID in the extracted delivery history information. By contrast, the second control part 23C avoids extracting the delivery destination peculiar information associated with the delivery destination ID from the memory 22C when the update date and time associated with the delivery destination ID is not later than the date and time of the previous delivery to the delivery destination associated with the delivery destination ID in the extracted delivery history information.

FIG. 18 is a table showing an example of the delivery destination information in the fourth embodiment.

The delivery destination information shown in FIG. 18 associates delivery destination IDs, delivery destination peculiar information, and update dates and times with one another.

The delivery destination IDs and the delivery destination peculiar information correspond to those in the first embodiment except that each delivery destination ID here is associated with an update date and time at which delivery destination peculiar information was updated.

Subsequently, an information provision process by the delivery management server 2C and the smart glasses structure 3 in the fourth embodiment of the disclosure will be described.

Figure 19:
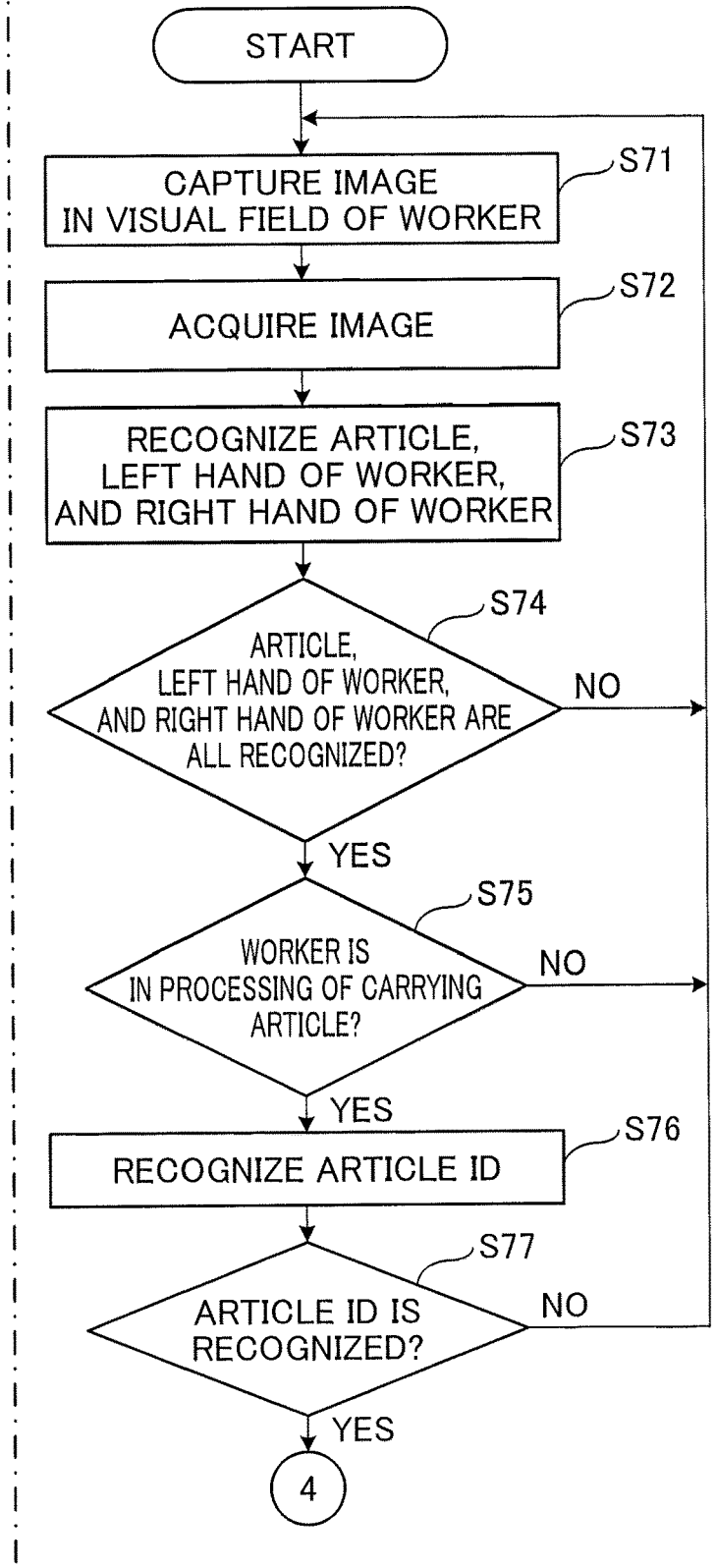
FIG. 19 is a first flowchart explaining an information provision process by a delivery management server and a smart glasses structure in the fourth embodiment of the disclosure.

FIG. 19 is a first flowchart explaining the information provision process by the delivery management server 2C and the smart glasses structure 3 in the fourth embodiment of the disclosure. FIG. 20 is a second flowchart explaining the information provision process by the delivery management server 2C and the smart glasses structure 3 in the fourth embodiment of the disclosure.

Step S71 to step S80 in FIG. 19 and FIG. 20 are the same as step S1 to step S10 in FIG. 5 and FIG. 6, and thus, descriptions therefor will be omitted.

Then, in step S81, the second control part 23C determines whether a worker ID received at present by the second communication part 21 is identical to a previous worker ID included in delivery history information. When it is determined that the worker ID at present and the previous worker ID are identical to each other (YES in step S81), the second control part 23C determines, in step S82, whether an update date and time of delivery destination peculiar information associated with a delivery destination ID is later than a date and time of a previous delivery to the delivery destination associated with the delivery destination ID in the extracted delivery history information.

Here, when it is determined that the update date and time of the delivery destination peculiar information is not later than the date and time of the previous delivery, that is, when it is determined that the update date and time of the delivery destination peculiar information is the date of the previous delivery or earlier (NO in step S82), the information provision process finishes owing to non-necessity of providing the delivery destination peculiar information for the worker.

By contrast, when it is determined that the update date and time of the delivery destination peculiar information is later than the date and time of the previous delivery (YES in step S82) or it is determined that the worker ID at present and the previous worker ID are not identical to each other (NO in step S81), the second control part 23C extracts delivery destination peculiar information associated with the delivery destination ID from the memory 22 in step S83.

Step S84 to step S86 in FIG. 20 are the same as step S13 to step S15 in FIG. 6, and thus, descriptions therefor will be omitted.

Conclusively, in a case where delivery destination peculiar information was updated in a period from a previous delivery to a delivery destination by a worker to a current date, the updated delivery destination peculiar information is provided for a worker even when a worker ID at present and a previous worker ID are identical to each other. This thus allows the worker to deliver the article in consideration of the latest delivery destination peculiar information.

Although the display part 34 displays delivery destination peculiar information in each of the first to fourth embodiments, the present disclosure is not limited to the displaying. The smart glasses structure 3, 3B may include a speaker, and the first control part 32, 32B may output delivery destination peculiar information to the speaker. The speaker may output the delivery destination peculiar information in a sound.

In each of the first to fourth embodiments, the first control part 32, 32B may suspend outputting of delivery destination peculiar information after a lapse of a predetermined time period from the outputting of the delivery destination peculiar information.

In each of the first to fourth embodiments, the first control part 32, 32B may recognize an article being an operation object of a worker and a hand of the worker by image recognition processing of an acquired image after outputting delivery destination peculiar information. The first control part 32, 32B may then determine, on the basis of a positional relation between the recognized article and the recognized hand, whether the worker has released the hand from the article. At this time, when the recognized article is not located between a position of a recognized right hand of the worker and a position of a recognized left hand of the worker, the first control part 32, 32B may determine that the worker has released the hands from the article. The first control part 32, 32B may suspend the outputting of the delivery destination peculiar information when it is determined that the worker has released the hands from the article. This keeps the display part 34 from displaying the delivery destination peculiar information.

In the embodiments, each constituent element may be realized with dedicated hardware or by executing a software program suitable for the constituent element. Each constituent element may be realized by a program execution unit, such as a CPU or a processor, reading out and executing a software program recorded on a recording medium, such as a hard disk or a semiconductor memory. Other independent computer system may establish a program by recording the program in a recording medium to be transferred, or transferring the program via a network.

A part of or a whole of the functions of the device according to the embodiment of the disclosure are typically realized as a large scale integration (LSI), which is an integrated circuit. These functions may be formed as separate chips, or some of or a whole of the functions may be included in one chip. The circuit integration is not limited to the LSI, and may be realized with a dedicated circuit or a general-purpose processor. A field programmable gate array (FPGA) that is programmable after manufacturing of an LSI or a reconfigurable processor in which connections and settings of circuit cells within the LSI are reconfigurable may be used.

A part of or a whole of the functions of the device according to the embodiment of the present disclosure may be implemented by a processor, such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

INDUSTRIAL APPLICABILITY

The technology according to the present disclosure enables provision of delivery destination peculiar information which is peculiar to a delivery destination and is about a delivery only for a worker who needs the delivery destination peculiar information, and achieves improvement in a work efficiency of the worker. The technology is therefore useful for assisting the worker with a work of delivering an article.

The invention claimed is:

1. An information processing system, comprising:
a smart glasses structure in an eyeglasses shape to be attached to a head of a worker while the worker delivers an article to a delivery destination, the article being an operation object of the worker; and
a delivery management server communicably connected to the smart glasses structure, wherein
the smart glasses structure includes a camera, a first control part, a first communication part, and a trans-reflective display,
the delivery management server includes a second control part, a second communication part, and a memory,
the camera is attached to the smart glasses structure and captures an image in a visual field of the worker,
the first control part executes:
acquiring the image captured by the camera; and
recognizing an article ID identifying the article by image recognition processing of the acquired image,
the first communication part sends the recognized article ID and a worker ID identifying the worker,
the second communication part receives the article ID and the worker ID sent by the first communication part,
the trans-reflective display is attached to the smart glasses structure and is arranged to display information in the visual field of the worker in an augmented reality manner,
the memory stores:
delivery history information associating article IDs, delivery destination IDs respectively identifying delivery destinations of articles, worker IDs identifying workers having delivered the articles to the delivery destinations, and delivery complete dates and times of the articles with one another; and
delivery destination information associating the delivery destination IDs with delivery destination peculiar information which is peculiar to the delivery destinations respectively and is about the deliveries of the articles, the second control part executes:
extracting, from the memory, delivery history information associated with the delivery destination ID associated with the received article ID;
determining whether the worker ID received at present is identical to a previous worker ID of a worker having previously delivered to the delivery destination associated with the delivery destination ID in the extracted delivery history information; and
extracting delivery destination peculiar information associated with the delivery destination ID from the memory when the worker ID received at present and the previous worker ID are not identical to each other,
the second communication part sends the extracted delivery destination peculiar information,
the first communication part receives the delivery destination peculiar information sent by the second communication part, and
the first control part outputs the received delivery destination peculiar information to the trans-reflective display, and the trans-reflective display displays the received delivery destination peculiar information in the visual field of the worker in the augmented reality manner.

2. The information processing system according to claim 1, wherein the delivery destination peculiar information includes information about a treatment for absence of a recipient at the delivery destination.

3. The information processing system according to claim 1, wherein the first control part executes:
recognizing the article being the operation object of the worker and a hand of the worker by the image recognition processing of the acquired image;
determining, on the basis of a positional relation between the recognized article and the recognized hand, whether the worker is in processing of carrying the article; and
recognizing the article ID by the image recognition processing of the acquired image when it is determined that the worker is in the processing of carrying the article.

4. The information processing system according to claim 1, wherein the second control part executes:
determining whether a predetermined day or more days have elapsed from a date of the previous delivery to the delivery destination associated with the delivery destination ID in the extracted delivery history information when the worker ID received at present and the previous worker ID are identical to each other; and
extracting the delivery destination peculiar information associated with the delivery destination ID from the memory in a case where the predetermined day or more days have elapsed from the date of the previous delivery.

5. The information processing system according to claim 1, wherein the second control part executes:
determining whether the number of past deliveries to the delivery destination associated with the delivery destination ID in the extracted delivery history information falls within a predetermined number of deliveries when the worker ID received at present and the previous worker ID are identical to each other; and
extracting, from the memory, the delivery destination peculiar information associated with the delivery destination ID when the number of past deliveries falls within the predetermined number of deliveries.

6. The information processing system according to claim 1, wherein the first control part executes:
determining whether a recipient is absent at the delivery destination after receiving the delivery destination peculiar information; and
outputting the received delivery destination peculiar information when the recipient is absent at the delivery destination.

7. The information processing system according to claim 6, further comprising an information terminal communicably connected to the smart glasses structure for outputting a delivery notice informing the recipient that the worker brings the article back due to the absence of the recipient at the delivery destination, wherein the information terminal sends a delivery notice output notification to the smart glasses structure when outputting the delivery notice,
the first communication part receives the delivery notice output notification sent by the information terminal, and
the first control part determines that the recipient is absent at the delivery destination when the first communication part receives the delivery notice output notification.

8. The information processing system according to claim 1, wherein the delivery destination ID and the delivery destination peculiar information in the delivery destination information are further associated with an update date and time at which the delivery destination peculiar information was updated, and the second control part extracts the delivery destination peculiar information associated with the delivery destination ID from the memory, when the worker ID received at present and the previous worker ID are identical to each other and the update date and time associated with the delivery destination ID is later than a date and time of the previous delivery to the delivery destination associated with the delivery destination ID in the extracted delivery history information.

9. A delivery management method for a delivery management server communicably connected to a smart glasses structure attached to a head of a worker while the worker delivers an article to a delivery destination, the article being an operation object of the worker the delivery management method comprising:

receiving an article ID and a worker ID identifying the worker from the smart glasses structure-that recognizes the article ID identifying the article by image recognition processing of an image in a visual field of the worker captured by a camera and sends the recognized article ID and the worker ID, the camera being attached to the smart glasses structure;

extracting delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determining whether the worker ID received at present is identical to a previous worker ID of a worker having previously delivered to the delivery destination associated with the delivery destination ID in the extracted delivery history information, extracting delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker are not identical to each other, and sending the extracted delivery destination peculiar information to the smart glasses structure, the smart glasses structure including a trans-reflective display attached to the smart glasses structure, the trans-reflective display displaying the delivery destination peculiar information in the visual field of the worker in an augmented reality manner.

10. A smart glasses structure to be attached to a head of a worker while the worker delivers an article to a delivery destination, the article being an operation object of the worker, the smart glasses structure comprising:

a camera;
a control part;
a communication part; and
a trans-reflective display, wherein the camera captures an image in a visual field of the worker, the trans-reflective display is arranged to display information in the visual field of the worker in an augmented reality manner, the control part executes:
acquiring the image captured by the camera; and
recognizing an article ID identifying the article by image recognition processing of the acquired image, the communication part is configured to:
send the recognized article ID and a worker ID identifying the worker; and
receive delivery destination peculiar information sent by a delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information, and the control part outputs the received delivery destination peculiar information to the trans-reflective display, and the trans-reflective display displays the received delivery destination peculiar information in the visual field of the worker in the augmented reality manner.

11. An information processing method for a smart glasses structure to be attached to a head of a worker while the worker delivers an article to a delivery destination, the article being an operation object of the worker, the information processing method comprising:

acquiring an image in a visual field of the worker captured by a camera attached to the smart glasses structure, the image captured by the camera showing a scenery which is substantially the same as a scenery view by the worker with a naked eye of the worker;

recognizing an article ID identifying the article by image recognition processing of the acquired image;

sending the recognized article ID and a worker ID identifying the worker;

receiving delivery destination peculiar information sent by a delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information; and outputting the received delivery destination peculiar information to a trans-reflective display attached to the smart glasses structure and arranged to display the received delivery destination peculiar information in the visual field of the worker in an augmented reality manner.

12. A non-transitory computer readable recording medium storing an information processing program, comprising:
causing a computer to execute:
acquiring an image in a visual field of a worker captured by a camera attached to a smart glasses structure, the smart glasses structure being attached to a head of the worker while the worker delivers an article to a delivery destination, the article being an operation object of the worker;
recognizing an article ID identifying the article by image recognition processing of the acquired image;
sending the recognized article ID and a worker ID identifying the worker;
receiving delivery destination peculiar information sent by a delivery management server that receives the article ID and the worker ID, extracts delivery history information associated with a delivery destination ID associated with the received article ID from a memory that stores delivery history information associating article IDs, delivery destination IDs respectively identifying delivery destinations of articles, worker IDs identifying workers having delivered the articles to the delivery destinations, and delivery complete dates and times of the articles with one another, determines whether the worker ID received at present is identical to a previous worker ID of a worker having previously delivered to the delivery destination associated with the delivery destination ID in the extracted delivery history information, extracts delivery destination peculiar information associated with the delivery destination ID from the memory that stores delivery destination information associating the delivery destination IDs with delivery destination peculiar information which is peculiar to the delivery destinations respectively and is about the deliveries of the articles when the worker ID received at present and the previous worker ID are not identical to each other, and sends the extracted delivery destination peculiar information; and
outputting the received delivery destination peculiar information to a trans-reflective display attached to the smart glasses structure and arranged to display the received delivery destination peculiar information in the visual field of the worker in an augmented reality manner.

* * * * *